(12) United States Patent
Fukui et al.

(10) Patent No.: US 8,314,329 B2
(45) Date of Patent: Nov. 20, 2012

(54) DYE-SENSITIZED SOLAR CELL MODULE AND METHOD FOR MANUFACTURING THE SAME

(75) Inventors: Atsushi Fukui, Kashiba (JP); Ryohsuke Yamanaka, Gojyo (JP); Nobuhiro Fukui, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 424 days.

(21) Appl. No.: 12/307,643

(22) PCT Filed: Jul. 3, 2007

(86) PCT No.: PCT/JP2007/063318
§ 371 (c)(1),
(2), (4) Date: Jul. 23, 2009

(87) PCT Pub. No.: WO2008/004556
PCT Pub. Date: Jan. 10, 2008

(65) Prior Publication Data
US 2010/0024875 A1 Feb. 4, 2010

(30) Foreign Application Priority Data
Jul. 6, 2006 (JP) ................................ 2006-187010

(51) Int. Cl.
H01L 31/00 (2006.01)
(52) U.S. Cl. ........................ 136/263; 136/244
(58) Field of Classification Search .................. 136/263, 136/244
See application file for complete search history.

(56) References Cited

U.S. PATENT DOCUMENTS

| | | | | |
|---|---|---|---|---|
| 6,580,026 | B1* | 6/2003 | Koyanagi et al. | 136/263 |
| 2003/0140959 | A1* | 7/2003 | Gaudiana et al. | 136/244 |

FOREIGN PATENT DOCUMENTS

| | | |
|---|---|---|
| JP | 2664194 | 6/1997 |
| JP | 2001-357897 | 12/2001 |
| JP | 2002-540559 | 11/2002 |
| JP | 2004/319383 | 11/2004 |
| JP | 2005-093252 | 4/2005 |
| JP | 2005-174679 | 6/2005 |

(Continued)

OTHER PUBLICATIONS

International Search Report for PCT/JP2007/063318, mailed Sep. 25, 2007.

(Continued)

*Primary Examiner* — Basia Ridley
*Assistant Examiner* — Devina Pillay
(74) *Attorney, Agent, or Firm* — Nixon & Vanderhye P.C.

(57) ABSTRACT

A dye-sensitized solar cell module which is characterized by providing a pair of opposed substrates 10 and 17 in which at least one of the substrates is transparent and a plurality of conductive layers 11 and 18 are formed in parallel with one another on the each opposed surface of the substrates, a plurality of adjacent photoelectric conversion devices 1a and 1b formed in a state of being electrically connected in series between the pair of conductive substrates 11 and 17, and insulating layers 16 formed between the adjacent photoelectric conversion devices 1a and 1b, wherein the photoelectric conversion devices 1a and 1b have a porous semiconductor layer 12 adsorbing a dye, an electrolyte layer 13 and a catalyst layer 14 and the insulating layer 16 is formed by dividing into two or more times in the direction of a substrate thickness.

7 Claims, 7 Drawing Sheets

FOREIGN PATENT DOCUMENTS

| | | |
|---|---|---|
| JP | 2005-285781 | 10/2005 |
| JP | 2006-032110 | 2/2006 |
| JP | 2006-100025 | 4/2006 |
| JP | 2006-107885 | 4/2006 |
| JP | 2006-134870 | 5/2006 |
| JP | 2006-164697 | 6/2006 |
| WO | 97/16838 | 5/1997 |
| WO | 00/57441 | 9/2000 |

OTHER PUBLICATIONS

International Search Report for PCT/JP2007/063309, mailed Sep. 25, 2007.

* cited by examiner

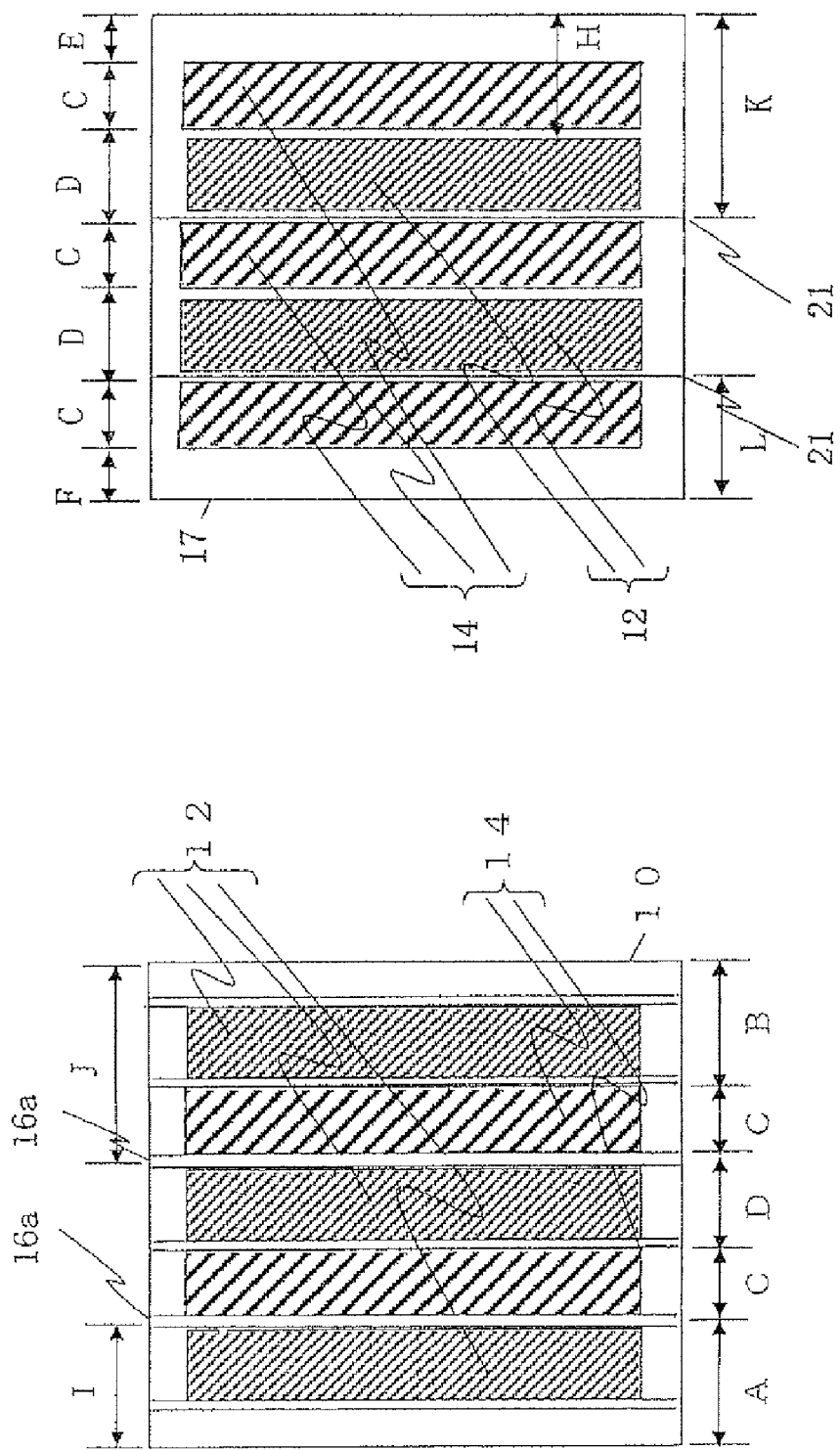

DYE-SENSITIZED SOLAR CELL MODULE AND METHOD FOR MANUFACTURING THE SAME

This application is the U.S. national phase of International Application No. PCT/JP2007/063318, filed 3 Jul. 2007, which designated the U.S. and claims priority to Japan Application No. 2006-187010, filed 6 Jul. 2006, the entire contents of each of which are hereby incorporated by reference.

TECHNICAL FIELD

The present invention relates to a dye-sensitized solar cell module and a method for manufacturing the same.

BACKGROUND ART

As an alternative energy source to fossil fuel, solar cells capable of converting sun light to electric power have drawn attention. Examples of solar cells, which have been partially used practically at present, include solar cells using crystalline silicon substrates and thin film silicon solar cells.

As a new type solar cell, a wet type solar cell based on photo-induced electron transfer of a metal complex has been described in Patent Document 1. This wet type solar cell has a constitution in which a photoelectric conversion layer is formed between electrodes respectively formed on two glass substrates using photoelectric conversion materials and electrolyte materials. This photoelectric conversion material has an absorption spectrum in a visible light region by adsorbing a metal complex which is a photosensitizing dye on the surface of a metal oxide semiconductor. In this wet type solar cell, when light is irradiated to the photoelectric conversion layer, electrons are generated and electrons transfer to a counter electrode through an external electric circuit. The electrons transferred to counter electrode are conveyed by ions in the electrolyte and return back to the photoelectric conversion layer. Electric energy is outputted based on repetitions of such electron transfer.

However, as for a basic structure of the dye-sensitized solar cell module described in Patent Document 1, a dye-sensitized solar cell is made up by filling an electrolyte solution into between two glass substrates. Therefore, it is possible to produce a trial solar cell with a small surface area, but it is difficult to apply this solar cell to a solar cell with a large surface area such as 1 m square. That is, if in such a solar cell, the surface area of one photoelectric conversion device is enlarged, the generated current is increased proportional to the area. However, since a voltage drop in the plane direction of a transparent conductive film to be used for the electrode parts is increased, and the internal series resistance of the solar cell is increased. As a result, a fill factor (FF) in a current-voltage characteristic and a short circuit current at the time of the photoelectric conversion are lowered, resulting in a problem of decrease of the photoelectric conversion efficiency.

In order to solve such the problems, for example, in Patent Documents 2 and 3, there has been proposed a dye-sensitized solar cell module having a structure shown in FIG. 11. In the case of preparing this solar cell module, first, a porous semiconductor layer 112 and a catalyst layer 114 are alternately formed on two glass substrates 100 and 117 having transparent electrodes 111 and 118 formed in a comb-like shape by patterning, respectively. Next, an insulating adhesive is applied between the porous semiconductor layer 112 on one substrate and the catalyst layer 114 of the other substrate. Then, two opposed substrates were bonded to each other by overlaying both substrates on each other with the porous semiconductor layer 112 and the catalyst layer 114 opposed to each other and curing the insulating adhesive to form an insulating layer 115 between devices, and by filling an electrolyte solution into a gap between substrates and sealing a filling portion with a resin, a dye-sensitized solar cell module (the so-called W-type module), in which a plurality of photoelectric conversion devices are connected in series, has been prepared.

Further, in Patent Document 4, as shown in FIG. 12, there has been proposed a dye-sensitized solar cell module (the so-called Z-type module) in which a plurality of photoelectric conversion devices are connected in series by providing electrical continuity between one conductive layer 121 and the other conductive layer 128 of adjacent photoelectric conversion devices 121a, 121a through a connecting conductive layer 129. In this solar cell module, in order to prevent the corrosion of the connecting conductive layer 129 and the continuity in electrical charge between the connecting conductive layer 129 and an electrolyte layer 123, the electrolyte layer 123 is isolated from the connecting conductive layer 129 by insulating layers 125, 125 between devices. In addition, in FIG. 12, a reference numeral 122 denotes a porous semiconductor layer, and a reference numeral 124 denotes a catalyst layer.

Patent Document 1: Japanese Patent No. 2664194
Patent Document 2: Domestic Re-Publication of PCT International Application WO2002/052654 pamphlet
Patent Document 3: Published Japanese Translation of a PCT application No. 2005-516364
Patent Document 4: Japanese Unexamined Patent Publication No. 2001-357897

DISCLOSURE OF THE INVENTION

Problems to be Solved by the Inventions

In the above-mentioned methods in Patent Documents 2 and 3 (FIG. 11), when two substrates 100, 117 were bonded to each other in a manner described above, a degree of spread of the insulating adhesive (crush of the insulating adhesive) in a direction of substrate plane varies from location to location since a distance (gap) between the substrates varies depending on a camber of glass or the like. It was found that as a result of the crush of the insulating adhesive, the insulating adhesive (insulating layer 115 between devices) covers over a part of the porous semiconductor layer 112 or the catalyst layer 114 at a location where the degree of spread of the insulating adhesive is large to cause performance of the solar cell to deteriorate. Further, it was found that there is a problem that when an amount of the insulating adhesive is decreased in order to reduce an area of the insulating layer between devices to become a non-power generating part, the porous semiconductor layer 112 comes into contact with one substrate prior to contact with the insulating adhesive applied to the other substrate and therefore sealing or formation of the insulating layer 115 between devices could not be performed.

Furthermore, in the production of the W-type module, it was found that when a catalyst layer is formed through an application (printing) and firing of a paste, performance is deteriorated since a catalyst material flies apart in firing the paste to contaminate the porous semiconductor layer or the conductive layer.

Further, in the production of the Z-type module shown in FIG. 12, electrical continuity is achieved by bringing a connecting conductive layer 129 into physical contact with a conductive layer 128 on one substrate when bonding two substrates to each other after the connecting conductive layer 129 is formed on a conductive layer 121 of the other substrate. In this case, it was found that a location where the connecting conductive layer 129 cannot contact the conductive layer 128 physically due to a camber of glass is generated to cause performance of the solar cell to deteriorate.

The above-mentioned problems of these solar cell modules having structures shown in FIGS. 11 and 12 have not been presented, and these are revealed for the first time by experiments conducted by the present inventors.

The present invention was made in view of the above state of the art, it is an object of the present invention to provide a dye-sensitized solar cell module in which conversion efficiency and yield are improved and a method for manufacturing the same.

Means for Solving the Problems

Thus, in accordance with the present invention, there is provided a dye-sensitized solar cell module comprising a pair of opposed conductive substrates in which at least one of the substrates is transparent and a plurality of conductive layers are formed in parallel with one another on the each opposed surface of the substrates, a plurality of adjacent photoelectric conversion devices formed in a state of being electrically connected in series between the pair of conductive substrates, and insulating layers formed between the adjacent photoelectric conversion devices, wherein the photoelectric conversion devices have a porous semiconductor layer adsorbing a dye, an electrolyte layer and a catalyst layer and the insulating layer is formed by dividing into two or more times in the direction of a substrate thickness.

Further, in accordance with another aspect of the present invention, there is provided a method for manufacturing a dye-sensitized solar cell module comprising the steps of: (A) providing a pair of substrates, in which at least one of the substrates is transparent and a plurality of conductive layers are formed in parallel with one another on the each surface of the substrates, and forming a plurality of strap-form insulating layers by dividing into two or more times in the direction of a substrate thickness at predetermined intervals on the conductive layers and on the surface of substrate of one substrate or both substrates of the pair of substrates, and (B) forming a photoelectric conversion device having a porous semiconductor layer adsorbing a dye, an electrolyte layer and a catalyst layer on the plurality of conductive layers, wherein the step of forming the first insulating layer in aforementioned step (A) is performed before or after the step (B).

Effect of the Invention

In accordance with the dye-sensitized solar cell module of the present invention and the method for manufacturing the same, it is possible to have a insulating layer of a layered structure composed of a plurality of layers between adjacent photoelectric conversion devices, and to give at least one of the insulating layers a role of controlling a gap between substrates and give other insulating layers a role of bonding and fixing at the time of bonding the substrates. Consequently, the following effects are achieved.

(1) When a pair of substrates is bonded to each other, by reducing an amount of the insulating adhesive (second insulating layer), a degree of spread of this insulating adhesive in a direction of substrate plane can be suppressed low, and consequently penetration of the insulating adhesive into between the porous semiconductor layer and the catalyst layer is inhibited to increase an effective area of a light receiving plane and decrease an inhibition of charge transportation between the porous semiconductor layer and the catalyst layer due to an electrolyte solution, and therefore performance of the solar cell module is improved.

(2) Since a thick insulating layer (first insulating layer) can be formed in response to a film thickness of the porous semiconductor layer which is relatively thick among layers constituting a cell, a problem that the porous semiconductor layer comes into contact with the other substrate at the time of bonding the substrates and therefore insulating layers cannot be formed between cells and at the periphery of the cell does not arise.

(3) Furthermore, the method for manufacturing a dye-sensitized solar cell module of the present invention, in the case of producing a W-type module, when an insulating layer between devices is formed before forming a catalyst layer, this can prevent the porous semiconductor layer and the conductive layer from being contaminated by flying of a catalyst material occurring in forming the catalyst layer and deterioration of performance of the W-type module can be avoided.

BRIEF DESCRIPTION OF THE DRAWINGS

FIG. 3 is a second diagram illustrating a production process of the dye-sensitized solar cell module of Embodiments 1 and 2.

DESCRIPTION OF THE REFERENCE NUMERALS AND SYMBOLS

| | |
|---|---|
| 1a, 1b, 3a, 3b | photoelectric conversion device |
| 10, 17, 30, 37 | substrate |
| 11, 18, 31, 38 | conductive layer |
| 12, 32 | porous semiconductor layer |
| 13, 33 | electrolyte layer |
| 14, 34 | catalyst layer |

| | |
|---|---|
| 16, 36 | insulating layer |
| 16a, 36a | first insulating layer |
| 16b, 36b | second insulating layer |
| 39 | connecting conductive layer |
| 39a | first connecting conductive layer |
| 39b | second connecting conductive layer |

BEST MODE FOR CARRYING OUT THE INVENTION

A dye-sensitized solar cell module of the present invention contains a pair of opposed conductive substrates in which at least one of the substrates is transparent and a plurality of conductive layers are formed in parallel with one another on the each opposed surface of the substrates, a plurality of adjacent photoelectric conversion devices formed in a state of being electrically connected in series between the pair of conductive substrates, and insulating layers formed between the adjacent photoelectric conversion devices, wherein the photoelectric conversion devices have a porous semiconductor layer adsorbing a dye, an electrolyte layer and a catalyst layer and the insulating layer is formed by dividing into two or more times in the direction of a substrate thickness.

Hereinafter, in the present specification, there may be cases where the "dye-sensitized solar cell module" is referred to as just a "solar cell module" and the "porous semiconductor layer adsorbing a dye" is referred to as just a "porous semiconductor layer". Further, in the present invention, the "photoelectric conversion device" means a power generating layer which has a porous semiconductor layer adsorbing a dye, an electrolyte layer and a catalyst layer and substantially contributes to power generation.

Figure 9:
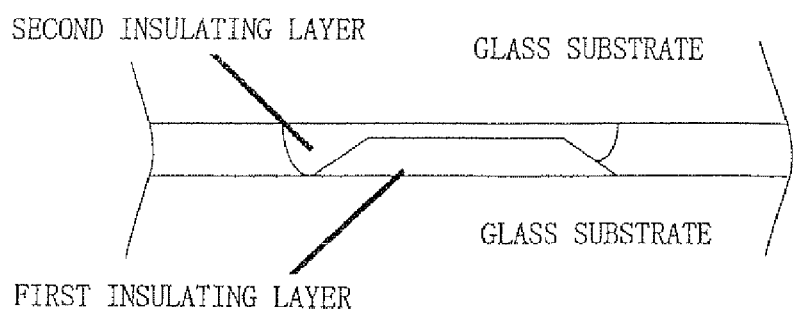
FIG. 9 is an explanatory diagram showing a state in which a second insulating layer is crushed in the production process of the dye-sensitized solar cell module of Embodiment 1.
Figure 10:
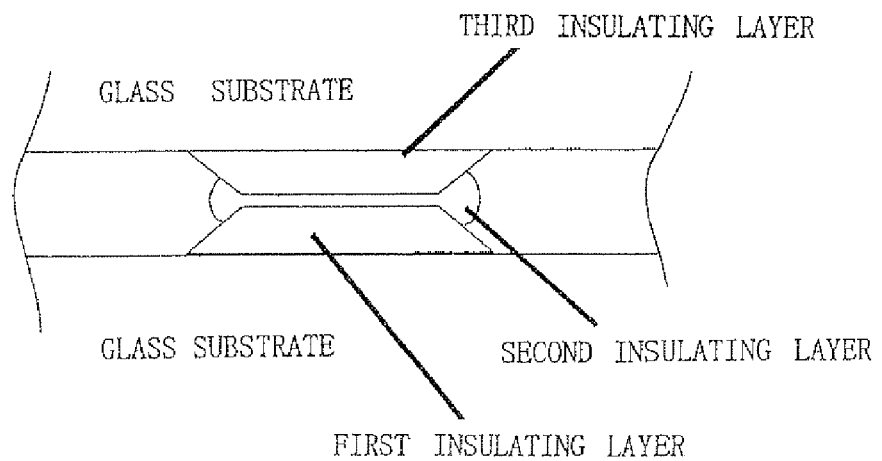
FIG. 10 is an explanatory diagram showing a state in which a second insulating layer is crushed in the production process of the dye-sensitized solar cell module of Embodiment 2.
Figure 11:
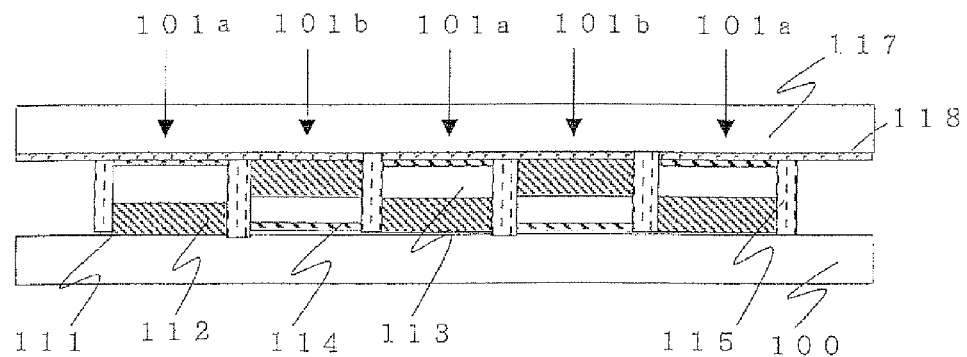
FIG. 11 is a schematic constituent sectional view showing a conventional dye-sensitized solar cell module.
Figure 12:
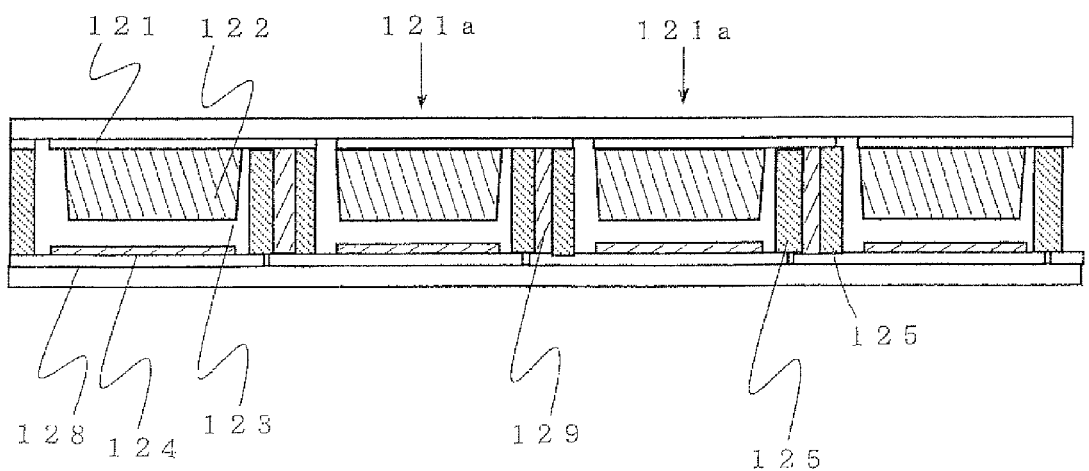
FIG. 12 is a schematic constituent sectional view showing another conventional dye-sensitized solar cell module.

In the present invention, "the insulating layer is formed by dividing into two or more times in the direction of a substrate thickness" means that the insulating layer has a layer structure of two or more layers. This "layer structure", as shown in FIGS. 9 and 10, includes the form in which a second insulating layer to exert an adhesion effect is crushed due to bonding of the substrates in manufacturing a solar cell module, and crushed second insulating layer adheres to a periphery of a first insulating layer and a third insulating layer. In addition, FIG. 9 shows the case where the insulating layer has a two-layer structure and FIG. 10 shows the case where the insulating layer has a three-layer structure. Here, the first insulating layer of the two-layer structure and the first and the third insulating layers of the three-layer structure are an insulating layer which is formed prior to the second insulating layer in production steps, and the first insulating layer and the third insulating layer are respectively formed on separate substrates. In addition, "first" and "third" in the first insulating layer and the third insulating layer do not mean an order of forming.

In the present invention, when the insulating layer has the two-layer structure consisting of the first insulating layer and the second insulating layer, a thickness of the first insulating layer is preferably a thickness of the second insulating layer or more, and more preferably a thickness which is slightly (for example, at 50 μm or less) smaller than that of the photoelectric conversion device when the first insulating layer takes a role of substantially controlling a gap between substrates and the second insulating layer takes a role of substantially bonding a pair of the substrates to each other Here, a phrase "the first insulating layer substantially controls a gap between substrates" described above means that a distance between opposed surfaces of a pair of substrates having conductive layers is substantially determined by the film thickness of the first insulating layer. Further, a phrase "the second insulating layer substantially bonds a pair of the substrates to each other" described above means that the second insulating layer ultimately bonds a pair of the substrates to each other with the first insulating layer at the time of manufacturing the solar cell module of the present invention.

As described above, because by setting a thickness of the first insulating layer at a thickness which is slightly smaller than a thickness of the photoelectric conversion device, a thickness of the second insulating layer becomes small, a small amount of a material of the second insulating layer is sufficient for use in manufacturing this solar cell module, and spread (crush) of the material of the second insulating layer in a direction of substrate plane in bonding a pair of substrates to each other becomes small. As a result of this, an area at which the second insulating layer in a solar cell module manufactured and an adjacent photoelectric conversion device overlap is small, and therefore an effective area of a light-receiving plane of the solar cell module is increased and photoelectric conversion efficiency of the solar cell module is improved. Furthermore, even when a film thickness of the porous semiconductor layer is large, by setting a film thickness of the first insulating layer high, the first insulating layer and the second insulating layer can contact the pair of the substrates with reliability to prevent a short circuit between adjacent cells with reliability.

In this case, a material composing the first insulating layer and a material composing the second insulating layer may be the same or may be different from each other. When both materials are the same, there is an example in which the material composing the first insulating and the material composing the second insulating layer both comprise a material containing organic polymer compounds, and when both materials are different, there is an example in which the first insulating layer is made of inorganic materials and the second insulating layer is made of materials containing organic polymer compounds. In addition, materials composing the insulating layer will be described in detail later.

In the present invention, the insulating layer may have the three layer structure further having the third insulating layer. In this case, the second insulating layer to exert an adhesion effect is located between the third insulating layer and the first insulating layer, and the total thickness of a thickness of the first insulating layer and a thickness of the third insulating layer is preferably a thickness of the second insulating layer or more, and more preferably a thickness which is slightly (for example, at 50 μm or less) smaller than a thickness of the photoelectric conversion device. If doing so, it is favorable for the first insulating layer and the third insulating layer to take a role of substantially controlling a gap between substrates and for the second insulating layer to take a role of substantially bonding a pair of the substrates to each other. Here, a phrase "the first insulating layer and the third insulating layer substantially controls a gap between substrates" described above means that a distance between opposed surfaces of a pair of substrates having conductive layers is substantially determined by the total film thickness of the first insulating layer and the third insulating layer. Further, a phrase "the second insulating layer substantially bonds a pair of the substrates to each other" described above means that the second insulating layer ultimately bonds a pair of the substrates to each other with the first insulating layer and the third insulating layer at the time of manufacturing the solar cell module of the present invention.

As described above, the total thickness of a thickness of the first insulating layer and a thickness of the third insulating layer is a thickness which is slightly smaller than a thickness of the photoelectric conversion device, and thereby, a film thickness of the second insulating layer becomes small, and therefore a small amount of a material of the second insulating layer is sufficient for use in manufacturing this solar cell module, and spread of the material of the second insulating layer in a direction of substrate plane in bonding a pair of substrates to each other becomes small. As a result of this, a second insulating layer in a solar cell module manufactured does not penetrate into an adjacent photoelectric conversion device (for example, an electrolyte layer), and charge transportation between the porous semiconductor layer and the catalyst layer is not inhibited and an effective area of a light-receiving plane is increased, and photoelectric conversion efficiency of the solar cell module is improved.

Also in this case, materials composing the first, the second and the third insulating layers may be the same or may be different from each other. When all materials are the same, there is an example in which these materials comprise a material containing organic polymer compounds, and when these materials are different, there is an example in which the first insulating layer and the third insulating layer are made of inorganic materials and the second insulating layer is made of materials containing organic polymer compounds.

In the present invention, the porous semiconductor layer and the catalyst layer respectively composing the photoelectric conversion device are laminated with the electrolyte layer therebetween, but an order of laminating the respective layers from a light-receiving plane side may be the same or may be reverse as in an adjacent cell as long as a plurality of cells are electrically connected in series. That is, when the order of laminating the respective layers from a light-receiving plane side is the porous semiconductor layer, the electrolyte layer, and the catalyst layer in an cell, the same order or a reverse order is used for an adjacent cell.

The dye-sensitized solar cell module described above is applicable for the so-called W-type module in which the orders of laminating the respective layers (porous semiconductor layer, electrolyte layer, and catalyst layer) are reverse between adjacent cells. In this case, a conductive layer of one substrate contact a porous semiconductor layer in a cell and a catalyst layer in another cell adjacent to one side of the cell, and a conductive layer of the other substrate contact a catalyst layer in a cell and a porous semiconductor layer in another cell adjacent to the other side of the cell, and thereby a plurality of cells are electrically connected in series.

On the other hand, when the orders of laminating the respective layers (porous semiconductor layer, electrolyte layer, and catalyst layer) are the same between adjacent cells, the present invention is applicable to a dye-sensitized solar cell module having a structure (the so-called Z-type module) in which a pair of the insulating layers are located along one photoelectric conversion device and adjacent another photoelectric conversion device, respectively, and a connecting conductive layer electrically connected to the pair of aforementioned conductive layers is formed between the pair of aforementioned insulating layers. In this case, the connecting conductive layer may be one layer or two or more layers, and the connecting conductive layer of two or more layers is preferably used because physical and electric contact with the conductive layers on a pair of substrates becomes better.

When the conductive layer has a two-layer structure consisting of a first connecting conductive layer and a second connecting conductive layer, a thickness of the first connecting conductive layer is preferably a thickness of the second connecting conductive layer or more, and more preferably a thickness which is slightly (for example, at 50 µm or less) smaller than that of the photoelectric conversion device. The reason for this is that the first connecting conductive layer also takes a role of substantially controlling a gap between substrates together with the first insulating layer. Thereby, the second connecting conductive layer is prevented from spreading at the time of bonding a pair of substrates to each other and can contact the conductive layers on the pair of the substrates with reliability together with the first connecting conductive layer to reduce contact resistance.

Hereinafter, the respective constituent elements of the dye-sensitized solar cell module of the present invention will be described.

(Substrate)

As the substrate, a substrate made of a material have a light transmitting property is used for a substrate used on the side of a light-receiving plane of a solar cell module and a light transmitting property is not particularly limited for a substrate used on the side of a non-light receiving plane.

As the transparent substrate, generally, glass substrates made of soda-lime float glass, quartz glass or the like, and transparent polymer sheets made of tetraacetyl cellulose (TAC), poly(ethylene terephthalate) (PET), poly(phenylene sulfide) (PPS), polycarbonate (PC), polyallylate (PA), poly (ether imide) (PEI), a phenoxy resin or the like can be used. The transparent polymer sheets are advantageous in terms of cost and flexibility. When these transparent substrates are used, the conductive layers formed thereon require to be transparent.

Examples of the substrate used on the side of a non-light receiving plane include the above-mentioned transparent substrates and metal sheets. When the metal sheet is used, since the metal sheet may be subject to corrosion depending on a combination of a metal material and an electrolyte, it is preferable to coat at least the surface of the metal sheet, which comes into contact with the electrolyte layer, with a corrosion-resistant metal oxide film.

(Conductive Layer)

As the conductive layer, a conductive layer made of a material have a light transmitting property is used for a conductive layer used on the side of a light-receiving plane of a solar cell module and a light transmitting property is not particularly limited for a conductive layer used on the side of a non-light receiving plane.

Examples of a material of the transparent conductive layer include indium tin complex oxide (ITO), tin oxide ($SnO_2$), fluorine-doped tin oxide (F-doped $SnO_2$, FTO), and zinc oxide (ZnO).

Examples of the conductive layer used on the side of a non-light receiving plane include the above-mentioned transparent conductive layers and opaque materials such as metal films. When the opaque material is used, it is possible to omit the reduction in a film thickness, and when the electrolyte layer includes iodine, the conductive layer preferably has iodine resistance.

The conductive layer can be formed on the substrate by an ordinary method such as a sputtering method, a spraying method or the like. A film thickness of the conductive layer is preferably about 0.02 to 5 µm. The conductive layer preferably has a lower film resistance and a film resistance is preferably 40 ohm/sq or less. A transparent conductive substrate prepared by laminating a conductive layer made of fluorine-doped tin oxide on soda-lime float glass is particularly suitable.

A metal lead may be added in order to reduce resistance of a transparent conductive layer. As a material of the metal lead, platinum, gold, silver, copper, aluminum, nickel, and titanium are preferable. It is possible that a metal lead wire is formed on a substrate by a sputtering method or a vapor deposition method and thereon, a transparent conductive layer of tin oxide, ITO or the like is formed. Further, the metal lead wire may be formed by a sputtering method or a vapor deposition method after the transparent conductive layer of tin oxide, ITO or the like is formed. However, since installation of the metal lead wire leads to reduction in a quantity of incident light, a thickness of the metal lead wire is preferably 0.1 mm to several mm.

(Porous Semiconductor Layer)

The porous semiconductor layer may have various morphological states such as a granular state, a film-form state having a large number of fine pores, and the like at the surface and inside of the layer, and preferably the film-form state.

As a semiconductor used for the porous semiconductor layer, any semiconductor can be used as long as it is generally used in photoelectric conversion materials, and examples of the semiconductor include simple compounds such as titanium oxide, zinc oxide, tin oxide, iron oxide, niobium oxide, zirconium oxide, cerium oxide, tungsten oxide, silicon oxide, aluminum oxide, nickel oxide, barium titanate, strontium titanate, cadmium sulfide, lead sulfide, zinc sulfide, indium phosphide, copper-indium sulfide ($CuInS_2$), $CuAlO_2$, and $SrCu_2O_2$, or combinations thereof. Among others, titanium oxide, zinc oxide, tin oxide, and niobium oxide are preferable, and titanium oxide is preferable from the viewpoint of stability and safety.

In the present invention, titanium oxide includes various titanium oxides in narrow definition such as anatase type titanium oxide, rutile type titanium dioxide, amorphous titanium oxide, metatitanic acid and orthotitanic acid, and titanium hydroxide and hydrated titanium oxide. Two types of crystals, anatase type and rutile type, can become any type of anatase type and rutile type depending on their production methods or heat histories, but the anatase type is common. Particularly, as for sensitization of organic dye of the present invention, titanium oxide having a high content of anatase type is preferable and a proportion of the anatase type is preferably 80% or more. In addition, the anatase type has a shorter wavelength at a long wave end of photoabsorption than the rutile type and a degree of reduction in photoelectric conversion due to ultraviolet lay is small.

As a semiconductor for forming the porous semiconductor layer in the present invention, one or more semiconductors of the above-mentioned semiconductors can be selected and used.

These semiconductors may be a single crystal or may be a polycrystal, but the polycrystal is more preferable from the viewpoint of stability, difficulty of crystal growth, and production cost. Particularly, a fine powdered (nanometer to micrometer) polycrystalline semiconductor is preferable. Further, the same or different semiconductors having two or more particle sizes may be mixed. In this case, materials of the respective particles may be the same or may be different. The ratio between average particle diameters of the semiconductor particles having different particle sizes is preferably 10-folds or more. The particle with a larger particle diameter (100 to 500 nm) may be mixed for the purpose of scattering incident light and improving a light trapping ratio, and the particle with a smaller particle diameter (5 to 50 nm) may be mixed for the purpose of increasing number of adsorption points to make dye adsorption better. Particularly when different semiconductors are used in combination, it is more effective for dye adsorption that a semiconductor having high adsorption action is designated as a semiconductor with a smaller particle diameter.

Titanium oxide, which is the most preferable form of the semiconductor particle, can be prepared according to methods described in various references. Further, a method for obtaining chloride by high-temperature hydrolysis, developed by Degussa AG., may be employed.

Examples of a method for forming the porous semiconductor layer include a method in which a suspension containing semiconductor particles is applied onto a transparent conductive film and the applied suspension is dried and/or fired.

In the above-mentioned method, first, semiconductor particles are suspended in an appropriate solvent. Examples of such the solvent include glyme solvents such as ethylene glycol monomethyl ether, alcohol solvents such as isopropyl alcohol, alcohol base mixed solvents such as isopropyl alcohol/toluene, and water. Further, a commercially available titanium oxide paste (Ti-Nanoxide, D, T/SP, D/SP, produced by Solaronix S.A) may be used in place of these suspensions. Examples of a method for applying a suspension of semiconductor particles for forming a semiconductor layer to a substrate include publicly known methods such as a doctor blade method, a squeegee method, a spin coating method and a screen printing method. Then, the applied solution is dried and/or fired. Conditions of temperature, time, atmosphere and the like required for drying and firing can be appropriately adjusted according to kinds of the substrate and the semiconductor particles to be used, and examples of the conditions for drying and firing include a temperature within a range of about 50 to 800° C., for about 10 seconds to 12 hours, and an atmosphere of air or an atmosphere of inert gas. Drying and/or firing can be performed once at one temperature, or can be performed twice or more at varying temperatures. When the porous semiconductor layer is composed of a plurality of layers, two or more suspensions of semiconductor particles having different average particle diameters are provided, and the step of applying, drying and/or firing may be repeated twice or more.

A thickness of each layer of the porous semiconductor layer is not particularly limited, and examples of the thickness include about 0.1 to 100 µm. Further, from another point of view, the porous semiconductor layer preferably has a large specific surface area, and examples of a preferable specific surface area include about 10 to 500 $m^2/g$, and preferably 10 to 200 $m^2/g$. In addition, a specific surface area shown in the present invention is a value measured by a BET adsorption method.

After the porous semiconductor layer is formed on the conductive substrate having a conductive layer, if the porous semiconductor layer is a titanium oxide film, the semiconductor layer may be treated, for example, with an aqueous solution of titanium tetrachloride for the purpose of improving electrical connection between semiconductor particles, improving an surface area of the porous semiconductor layer, and decreasing a defective level of semiconductor particles.

(Sensitizing Dye)

The sensitizing dye is adsorbed on the porous semiconductor layer which serves as a photoelectrode. As the sensitizing dye in the present invention, various organic dyes and metal complex dyes, which have absorption in a region of visible light and/or an infrared region, are used. Typical examples of organic dyes include azo dyes, quinone dyes, quinone imine dyes, quinacridone dyes, squarylium dyes, cyanine dyes, merocyanine dyes, triphenylmethane dyes, xanthene dyes, porphyrin dyes, perylene dyes, indigo dyes, and naphthalocyanine dyes. The organic dyes generally have a larger absorptivity than metal complex dyes having a coordinate bond conformation in which molecules bond to a transition metal.

The metal complex dyes can also be used in addition to the above descried organic dyes. As the metal complex dye, examples thereof such as phthalocyanine dyes and ruthenium dyes containing metals such as Cu, Ni, Fe, Co, V, Sn, Si, Ti, Ge, Cr, Zn, Ru, Mg, Al, Pb, Mn, In, Mo, Y, Zr, Nb, Sb, La, W, Pt, Ta, Ir, Pd, Os, Ga, Tb, Eu, Rb, Bi, Se, As, Sc, Ag, Cd, Hf, Re, Au, Ac, Tc, Te and Rh are preferably used.

Among the metal complex dyes, ruthenium metal complex dyes are more preferable. For example, Ruthenium535 dye (produced by Solaronix S.A.) expressed by the formula (1), Ruthenium535-bisTBA dye (compound 3, produced by Solaronix S.A.) expressed by the formula (2), Ruthenium620-1H3TBA dye (compound 4, produced by Solaronix S.A.) expressed by the formula (3), and the like can be used.

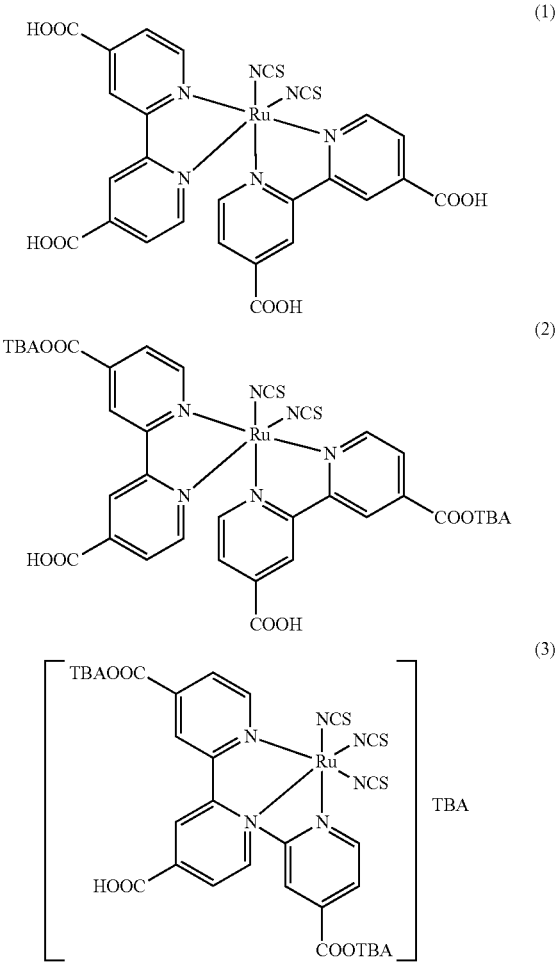

In the present invention, it is preferable to have an interlock group such as a carboxyl group, an alkoxy group, a hydroxyl group, a sulfonic acid group, an ester group, a mercapto group or a phosphonyl group in a dye molecule for adsorbing dye firmly on the porous semiconductor layer. Generally, the dye is fixed to a semiconductor with the interlock group interposed between the dye and the semiconductor, and has a function of providing an electrical bond to facilitate an electron transfer between a dye in an excited state and a conduction band of the semiconductor.

When the sensitizing dye is adsorbed on the porous semiconductor layer, a method, in which a laminated body obtained by forming the porous semiconductor layer on the conductive substrate is immersed in a dye solution, can be employed. The solvent of the dye solution is not particularly limited as long as it is a solvent, in which a photosensitized dye to be used is dissolved, and as the solvent of the dye solution, specifically, organic solvents such as alcohols, toluene, acetonitrile, THF, chloroform or dimethylformamide can be used. As the solvent, a purified solvent is preferably used. In order to enhance the solubility of a dye in a solvent, a temperature of the solvent may be elevated, or two or more kinds of different solvents may be mixed. The concentration of dye in the solvent can be adjusted in accordance with the species of a dye and a solvent to be used and conditions of a dye-adsorption step. The concentration of dye in the solution of a dye can be appropriately adjusted in accordance with the species of a dye and a solvent to be used, but a higher concentration is preferable for improving an adsorptive function, and for example, the concentration of $1 \times 10^{-5}$ mol/liter or more is preferable.

(Catalyst Layer)

A material of the catalyst layer is not particularly limited as long as it is a material, which activates an oxidation-reduction reaction of the electrolyte layer described later, and examples of the material include platinum, chloroplatinic acid, and carbons (carbon black, Ketjenblack, carbon nanotube, fullerene, etc.). The catalyst layer can be formed by methods such as a sputtering method, thermal cracking of chloroplatinic acid, a method in which a sol solution containing a catalyst material is applied and then at least one of drying and firing is performed, or electrodeposition.

(Electrolyte Layer: Oxidation-Reduction Species)

An oxidation-reduction electrolyte used for the electrolyte layer in the present invention is not particularly limited as long as it can be generally used in batteries or solar cells, and for example, an electrolyte solution containing an oxidation-reduction species such as $I^-/I_3^-$ type, $Br_2^-/Br_3^-$ type, $Fe_2^+/Fe_3^+$ type, quinine/hydroquinone type oxidation-reduction species and the like can be used. Specifically, combinations of metal iodides such as lithium iodide (LiI), sodium iodide (NaI), potassium iodide (KI), and calcium iodide ($CaI_2$) and iodine ($I_2$), combinations of tetraalkyl ammonium salt such as tetraethylammonium iodide (TEAI), tetrapropylammonium iodide (TPAI), tetrabutylammonium iodide (TBAI), and tetrahexylammonium iodide (THAI) and iodine, and combinations of metal bromides such as lithium bromide (LiBr), sodium bromide (NaBr), potassium bromide (KBr), and calcium bromide ($CaBr_2$) and bromine are preferable, and among these combinations, the combination of LiI and $I_2$ is particularly preferable.

Examples of a solvent of a liquid electrolyte layer include carbonate compounds such as propylene carbonate and the like, nitrile compounds such as acetonitrile and the like, alcohols such as ethanol and the like, water, and aprotic polar materials. Among these solvents, carbonate compounds and nitrile compounds are particularly preferable. These solvents may be used as a mixture of two or more thereof. Further, nitrogen-containing aromatic compounds such as t-butylpyridine (TBP), or imidazole salts such as dimethylpropylimidazole iodide (DMPII), methylpropylimidazole iodide (MPII), ethylmethylimidazole iodide (EMII), ethylimidazole iodide (EII), and hexylmethylimidazole iodide (HMII) may be added to the liquid electrolyte layer as an additive. The concentration of electrolyte in the liquid electrolyte layer is preferably 0.001 to 1.5 mol/liter, and particularly preferably 0.01 to 0.7 mol/liter.

(First Insulating Layer and Third Insulating Layer)

Materials of the first and the third insulating layers preferably contains an inorganic material. As the inorganic material, particles of zirconium oxide, silicon oxide, or aluminum oxide are preferable, and these materials may be used alone or in combination, and among these, a material containing silicon oxide which hardly adsorbs a dye is particularly preferable. An average particle diameter of these inorganic particles is 10 to 500 µm, preferably 20 to 300 µm, and more preferably 20 to 100 µm.

The first insulating layer and the third insulating layer can be formed by applying a suspension containing particles of, for example, the above-mentioned inorganic material onto the substrate surface and the conductive layer and drying and/or firing applied suspension. Specifically, first, inorganic particles are suspended in an appropriate solvent to prepare a suspension. Examples of such the solvent include glyme solvents such as ethylene glycol monomethyl ether, alcohol solvents such as isopropyl alcohol, alcohol base mixed solvents such as isopropyl alcohol/toluene, and water. Further, a commercially available inorganic material paste may be used in place of these suspensions. Examples of a method for applying a suspension containing inorganic particles to a substrate include publicly known methods such as a doctor blade method, a squeegee method, a spin coating method and a screen printing method. Conditions of temperature, time, atmosphere and the like required for drying and/or firing the applied solution can be appropriately adjusted according to materials of the substrate and the semiconductor to be used.

Further, the first insulating layer and the third insulating layer may be formed using the same material and the same method as those in the second insulating layer described later.

In the production of the W-type module, when the catalyst layer is formed by applying a sol solution of a catalyst material, and then performing at least one of drying and firing, it is preferable to form the catalyst layer after forming the insulating layer. By forming the insulating layer before forming the catalyst layer, it is possible to inhibit physically flying in all direction of a catalyst material, and therefore it is possible to prevent the contamination of the porous semiconductor layer and the conductive layer by the catalyst material. A film thickness of the insulating layer is preferably 1 to 50 µm from the viewpoint of preventing flying of a catalyst material, and more preferably 5 to 30 µm. In addition, "an insulating layer" referred to in the present invention means a first insulating layer and a third insulating layer formed prior to the second insulating layer.

Furthermore, in the present invention, it is preferable to form the insulating layers (the first and the third insulating layers) on the conductive substrate before forming the porous semiconductor layer, the catalyst layer and the electrolyte layer from the viewpoint of ease of a production step and improving properties of a produced solar cell module. The reason for this is that if the porous semiconductor layer is formed on the substrate before forming the insulating layers, the porous semiconductor layer becomes physical interference and it becomes difficult to form the insulating layer.

(Second Insulating Layer)

As a material of the second insulating layer, materials having elasticity are preferable, and resins made of an organic polymer are preferable. Examples of the resins include photosensitive resins, thermosetting resins and the like.

In the present invention, the photosensitive resins include photosensitive polymers in which a resin itself absorbs light energy to be cured, photosensitive compound-containing polymers in which a photosensitive compound (sensitizer) in a resin absorbs light energy and thereby the resin is cured, and photopolymerizable monomer-containing polymers in which a photopolymerizable monomer in a resin absorbs light energy, and thereby, the monomer is converted to a resin and the resin is cured. The photosensitive resin is not particularly limited, and for example, a commercially available ultraviolet-curable resin (e.g., 31X-101: produced by Three Bond Co., Ltd.) can be used.

Further, the thermosetting resin is not particularly limited, and examples of the thermosetting resin include epoxy resins, acrylic resins, phenolic resins, polyester resins, and polyurethane resins, and a thermosetting resin (for example, 2212B: produced by Three Bond Co., Ltd.) having a curing temperature of 200° C. or less, more preferably 150° C. or less, can be used from the viewpoint of not degrading a dye.

These resins are applied onto the first insulating layer or onto the conductive film and the substrate, and cured by irradiating ultraviolet lay to the resin or by heating the resin after a pair of substrates is bonded to each other to connect and fix two substrates to each other.

(First Connecting Conductive Layer)

As a material of the first connecting conductive layer, metals, carbon materials and conductive oxides, which have small specific resistance, are preferable, and specifically, platinum, gold, silver, copper, aluminum, nickel, titanium, graphite, carbon nanotube, fullerene, indium tin complex oxide (ITO), tin oxide ($SnO_2$), fluorine-doped tin oxide (F-doped $SnO_2$, FTO), and zinc oxide (ZnO) are preferable.

As for a method for forming the first connecting conductive layer, the first connecting conductive layer can be formed by applying a suspension containing particles of platinum, gold, silver, copper, aluminum, nickel or titanium onto the conductive substrate and drying and/or firing the applied suspension. Specifically, first, the above-mentioned particles (for example, 20 to 500 µm) are suspended in an appropriate solvent to prepare a suspension. Examples of such the solvent include glyme solvents such as ethylene glycol monomethyl ether, alcohols such as isopropyl alcohol, alcohol base mixed solvents such as isopropyl alcohol/toluene, and water. Further, a commercially available conductive paste may be used in place of these suspensions. Examples of a method for applying a suspension onto a conductive substrate include publicly known methods such as a doctor blade method, a squeegee method, a spin coating method and a screen printing method. Then, the applied solution is dried and/or fired. Conditions of temperature, time, atmosphere and the like required for drying and/or firing can be appropriately adjusted according to materials of the substrate and the porous semiconductor layer to be used.

(Second Connecting Conductive Layer)

The second connecting conductive layer is preferably made of metals or carbon materials which have small specific resistance, and specifically, it is preferably made of platinum, gold, silver, copper, aluminum, nickel, titanium, graphite, carbon nanotube, or fullerene. Specifically, a conductive paste containing particles of the above-mentioned metals or carbon materials can be used as a material for forming the second connecting conductive layer. When a pair of substrates is bonded to each other after a dye is adsorbed on the porous semiconductor layer, it is preferable to use a conductive paste having a curing temperature of 200° C. or less, more preferably 150° C. or less, from the viewpoint of not degrading a dye. For example, commercialized products such as a conductive paste produced by Fujikura Kasei Co., Ltd., a polymer type conductive paste produced by Asahi Chemical Research Laboratory Co., Ltd. and the like can be used.

The dye-sensitized solar cell module of the present invention, which has the above-mentioned constitution, can be manufactured by a method for manufacturing a dye-sensitized solar cell module in which a pair of substrates, in which at least one of the substrates is transparent and a plurality of conductive layers are formed in parallel with one another on the each opposed surface of the substrates, is provided, comprising the step (A) of forming a plurality of strap-form insulting layers separately divided into two or more formations in a direction of a substrate thickness at predetermined intervals on the conductive layers of one substrate or both substrates of the pair of substrates and on the surfaces of substrates, and the step (B) of forming a photoelectric conversion device having a porous semiconductor layer adsorbing a dye, an electrolyte layer and a catalyst layer on the plurality of conductive layers, wherein the step of forming a first insulating layer in the above-mentioned step (A) is performed before or after the step (B).

Hereinafter, the present invention will be described in more detail by way of Embodiments and Examples referring to drawings, but the present invention is not limited to these Embodiments and Examples.

Embodiment 1

Figure 1:
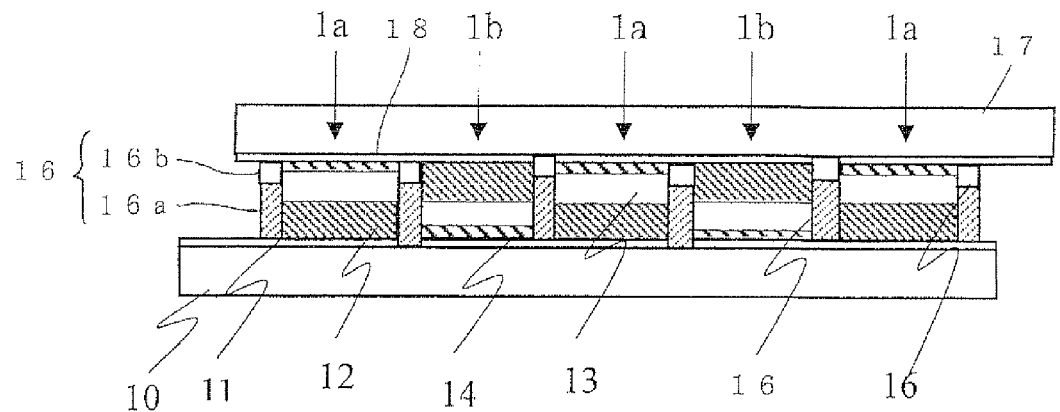
FIG. 1 is a schematic constituent sectional view showing a dye-sensitized solar cell module of Embodiment 1 of the present invention.

FIG. 1 is a sectional view showing a schematic constitution of a dye-sensitized solar cell module (W-type module) of Embodiment 1 of the present invention. In this solar cell module, a first photoelectric conversion device 1a and a second photoelectric conversion device 1b are alternately located in a state in which the first photoelectric conversion device 1a and the second photoelectric conversion device 1b are electrically connected in series between a pair of substrates 10, 17 having a plurality of conductive layers 11, 18 formed in parallel with one another on the surface of the substrates. In this embodiment, a lower substrate in FIG. 1 is taken as a light-receiving plane side, and at least the lower substrate 10 and the conductive layer 11 have a light transmitting property.

The first photoelectric conversion device 1a is formed by laminating the porous semiconductor layer 12, the electrolyte layer 13, and the catalyst layer 14 in succession from the lower substrate 10 and the second photoelectric conversion device 1b is formed by laminating the catalyst layer 14, the electrolyte layer 13, and the porous semiconductor layer 12 in succession from the lower substrate 10.

The lower conductive layer 11 is divided into two or more parts so as to be connected to the porous semiconductor layer 12 of the first photoelectric conversion device 1a and the catalyst layer 14 of the second photoelectric conversion device 1b adjacent to one side of the first photoelectric conversion device 1a and the upper conductive layer 18 is divided into two or more parts so as to be connected to the catalyst layer 14 of the first photoelectric conversion device 1a and the porous semiconductor layer 12 of the second photoelectric conversion device 1b adjacent to the other side of the first photoelectric conversion device 1a.

In this solar cell module, the insulating layer 16 formed by laminating the first insulating layer 16a and the second insulating layer 16b are formed between the first photoelectric conversion device 1a and the second photoelectric conversion device 1b. The first insulating layer 16a is located on the transparent conductive layer 11 and between two adjacent transparent conductive layers 11 on the substrate 10 and the second insulating layer 16b is located between two adjacent transparent conductive layers 11 on the substrate 17 and on the transparent conductive layer 11. By these insulating layers 16, photoelectric conversion devices are cut off from each other and this prevents an electrolyte in the electrolyte layer 13 of one photoelectric conversion device from penetrating into an adjacent another photoelectric conversion device. Further, a periphery of the solar cell module between a pair of the substrate 10, 17 is sealed with the insulating layer 16 and a resin sealing portion not shown and leakage of the electrolyte is prevented.

In this solar cell module, thicknesses of the conductive layers 11, 18 are 0.1 to 1 μm, respectively, a thickness of the porous semiconductor layer 12 is 1 to 50 μm, and a thickness of the catalyst layer 14 is 5 nm to 1 μm, but a catalyst material may adheres to the conductive layer in a cluster. Further, a thickness of the insulating layer 16 is 1 to 50 μm, and this thickness is equal to a distance between a lower or upper conductive layer and an upper or lower substrate, and a thickness of the first insulating layer 16a is 1 to 50 μm and a thickness of the second insulating layer 16b is less than 50 μm.

The solar cell module shown in FIG. 1 can be produced according to the following procedure.

Before performing the above-mentioned step (B), in the first step of forming an insulating layer of the step (A), a plurality of insulating layers (first insulating layer 16a) are formed on the conductive layer 11 and the surface of one substrate 10 of a pair of substrates 10, 17, and then in the step (B), the step (1) in which the porous semiconductor layer 12 and the catalyst layer 14 are formed between the insulating layers 16a on the conductive layers 11, 18 of the pair of substrates, the step (2) in which a dye is adsorbed on the porous semiconductor layer 12, the step (3) in which an uncured resin material is applied onto the insulating layer 16a, the step (4) in which a pair of substrates 10 and 17 are overlaid on each other in such a way that the porous semiconductor layer 12 on one substrate and the catalyst layer 14 on the other substrate are opposed to each other, and the uncured resin material is cured to form a second insulating layer 16b, and the step (5) in which an electrolyte solution is filled into between a pair of substrates 10 and 17 to form an electrolyte layer 13 between the porous semiconductor layer 12 and the catalyst layer 14 are performed.

When described specifically, as shown in FIG. 2, first, a pair of substrates 10, 17 having a plurality of divided conductive layers 11, 18 at the surface are provided, and a plurality of insulating layers are formed on the conductive layers 11 of the substrate 10 on a light-receiving plane side and on the surface of the substrate 10 (step (A)). The insulating layer is a first insulating layer 16a. The first insulating layer 16a can be formed by the above-mentioned method. In addition, in FIG. 2, a reference numeral 21 represents a scribe line which divides the conductive layers 11, 18 into two or more parts.

A thickness of the first insulating layer 16a is formed in a thickness (in this case, less than 50 μm) which is slightly smaller than a thickness (in this case, 1 to 50 μm) of cells 1a, 1b to be formed. By forming the first insulating layer 16a in this manner, the first insulating layer 16a plays a role of substantially decreasing a gap at the time of bonding the substrates and it becomes possible to reduce an amount of an uncured resin material, which is a material of the second insulating layer, applied at the time of bonding the substrates. Thereby, a degree of spread of the uncured resin material (crush of the insulating adhesive) in a direction of substrate plane at the time of bonding becomes small, and therefore a rate of the uncured resin material to cover over a part of the porous semiconductor layer or the catalyst layer to be formed in a subsequent step can be decreased and performance of the solar cell module can be enhanced. Further, when a film thickness of the porous semiconductor layer is large, if a film thickness of the first insulating layer 16a is controlled, it becomes possible to bond the substrates with a small quantity of uncured resin material, and a problem that an uncured resin material (an insulating adhesive) applied to one substrate does not contact the other substrate can be solved.

Further, as a material of the first insulating layer 16a, a material having hardness after the insulating layer is formed is preferable to prevent the paste from being destroyed by a printing pressure in applying the paste of a porous semiconductor onto the conductive layer using a squeegee in a subsequent step, and if a material having hardness is used, a distance (gap) between substrates can be kept stable. As the material of the first insulating layer 16a, inorganic materials, for example, glass frits containing silicon oxide is preferable, as described. Further, as the material of the first insulating layer 16a, organic polymers may be used if organic polymers have hardness after ultraviolet irradiation or thermal curing.

Next, in the above-mentioned step (B), the following steps (1) to (5) are performed.

Step (1): As shown in FIG. 3(a), the porous semiconductor layer 12 and the catalyst layer 14 are alternately formed between first insulating layers 16a on the conductive layer 11 of the substrate 10 on a light-receiving plane side, and as shown in FIG. 3(b), the catalyst layer 14 and the porous semiconductor layer 12 are alternately formed between regions for forming an insulating layer on the conductive layer 18 of the substrate 17 on a non-light receiving plane side. The porous semiconductor layer 12 and the catalyst layer 14 can be formed by the above-mentioned method.

As a method for applying a paste of the porous semiconductor layer 12, a method for applying by a dispenser and a method for applying by screen printing are preferable, and a method for applying by screen printing is most preferable. In screen printing, since the paste is pressed against a substrate at a constant pressure by a printing pressure by a squeegee even when the first insulating layer 16a exists, adhesion between the substrate and the porous insulating layer is improved compared with another methods.

Step (2): A laminated body obtained by forming the porous semiconductor layers 12 and the catalyst layers 14 on the substrates 10, 17 is immersed in a dye solution as described above to adsorb the dye on each porous semiconductor layer 12. Then, each laminated body is withdrawn from the dye solution and dried.

Step (3): An uncured resin material is applied onto a first insulating layer 16a of the substrate 10. The uncured resin material of this case is a material for forming a second insulating layer 16b. When the uncured resin material is a thermosetting resin, the uncured resin material is preferably a resin having a curing temperature of 200° C. or less, furthermore 150° C. or less to decrease damage to a dye adsorbed on the porous semiconductor layer.

Step (4): The respective substrates are overlaid on each other in such a way that the porous semiconductor layer 12 on the substrate 10 and the catalyst layer 14 on the substrate 17 are opposed to each other, and the uncured resin material is cured to form a second insulating layer 16b, and a pair of substrates 10, 17 are bonded to each other to be secured. In this time, when the uncured resin material is a photosensitive material, it is cured by irradiating light (for example, ultraviolet lay) from the side of a substrate having a light transmitting property, and when the uncured resin material is a thermosetting resin, it is cured by heating at a temperature at which a dye is not degraded.

Step (5): An electrolyte solution is filled into between a pair of substrates 10 and 17 to form an electrolyte layer 13 between the porous semiconductor layer 12 and the catalyst layer 14 of each photoelectric conversion device 1a, 1b. In this time, a gap part (not shown) is formed between substrates 10 and 17, and an electrolyte solution can be filled through this gap part by capillary action. Then, the gap part is sealed with a resin.

Embodiment 2

Figure 4:
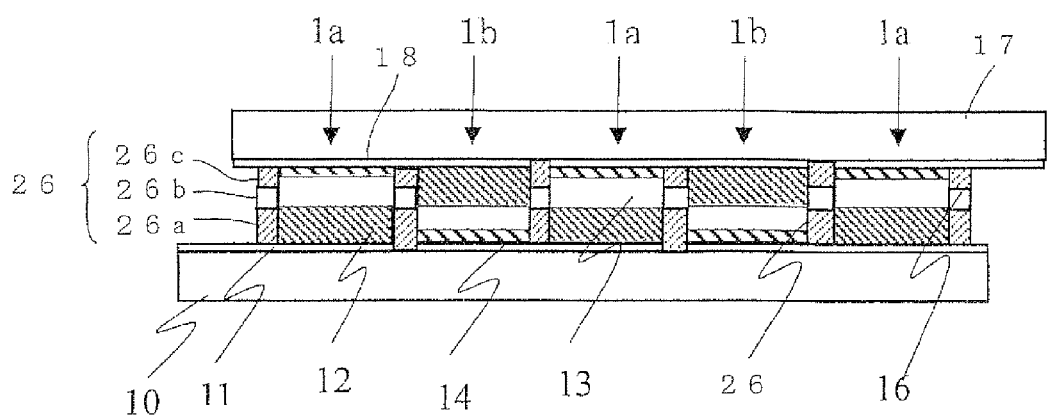
FIG. 4 is a schematic constituent sectional view showing a dye-sensitized solar cell module of Embodiment 2 of the present invention.

FIG. 4 is a sectional view showing a schematic constitution of a dye-sensitized solar cell module (W-type module) of Embodiment 2 of the present invention. In addition, in FIG. 4, the same reference numerals and characters are given to the constituent elements similar to Embodiment 1 shown in FIG. 1.

The solar cell module of Embodiment 2 has the same structure as in Embodiment 1 except that the insulating layer of this solar cell module has a structure of three layers as distinct from Embodiment 1. Hereinafter, difference of a structure of this solar cell module from that of Embodiment 1 will be mainly described.

In Embodiment 2, the insulating layer 26 is formed by laminating the first insulating layer 26a, the second insulating layer 26b and the third insulating layer 26c. The first insulating layers 26a are formed on the conductive layer 11 and on the substrate 10 on a light-receiving plane side and the third insulating layers 26c are formed on the conductive layer 18 and on the substrate 17 on a non-light receiving plane side, and the second insulating layer 26b is formed between the first insulating layer 26a and the third insulating layer 26c.

In this solar cell module, thicknesses of the respective layers other than the insulating layer 26 can be set at the same range of a thickness as in Embodiment 1. On the other hand, thicknesses of the first and the third insulating layers 26a, 26c are 1 to 50 μm and a thickness of the second insulating layer 26b is less than 50 μm.

The solar cell module shown in FIG. 4 can be produced according to the following procedure.

Before performing the above-mentioned step (B), in the first step of forming an insulating layer of the step (A), a plurality of insulating layers (first and third insulating layers 26a, 26c) are formed on the conductive layers 11, 18 of both substrates 10, 17 and the surfaces of both substrates 10, 17 of a pair of substrates 10, 17, and then in the step (B), the step (1) in which the porous semiconductor layer 12 and the catalyst layer 14 are formed between the insulating layers on the respective conductive layers 11, 18 of the pair of the substrates 10, 17, the step (2) in which a dye is adsorbed on the porous semiconductor layer 12, the step (3) in which an uncured resin material is applied onto the insulating layer, the step (4) in which a pair of substrates 10 and 17 are overlaid on each other in such a way that the porous semiconductor layer 12 on one substrate and the catalyst layer 14 on the other substrate are opposed to each other, and the uncured resin material is cured to form a second insulating layer 26b, and the step (5) in which an electrolyte solution is filled into between a pair of substrates 10 and 17 to form an electrolyte layer 13 between the porous semiconductor layer 12 and the catalyst layer 14 are performed.

Figure 2A:
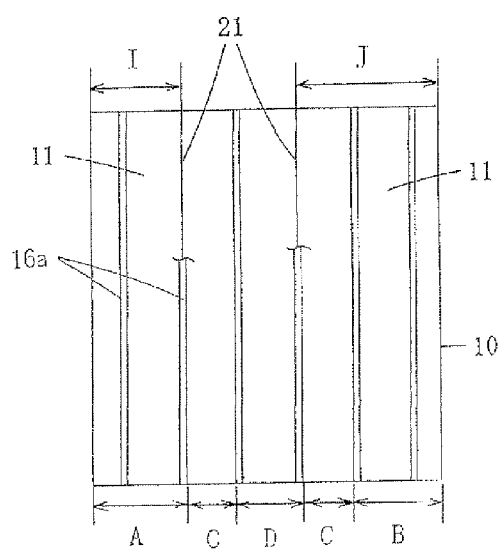
FIG. 2 is a first diagram illustrating a production process of the dye-sensitized solar cell module of Embodiments 1 and 2.

Specifically, in the above-mentioned step (A), as with explanation in FIG. 2(a), a plurality of first insulating layers 26a are formed on the conductive layers 11 of one substrate 10 and on the surface of substrate 10, and a plurality of third insulating layers 26c are formed on the conductive layers 18 of the other substrate 17 and on the surface of the other substrate 17. The first and the third insulating layers 26a, 26c can be formed by the above-mentioned method.

The total thickness of a thickness of the first insulating layer 26a and a thickness of the third insulating layer 26c is formed in a thickness (in this case less than 50 μm) which is slightly smaller than a thickness (in this case 1 to 50 μm) of photoelectric conversion devices 1a, 1b to be formed.

Next, in the above-mentioned step (B), the following steps (1) to (5) are performed.

Step (1): As with description in FIG. 3(a), the porous semiconductor layer 12 and the catalyst layer 14 are alternately formed between first insulating layers 26a on the conductive layer 11 of the substrate 10 on a light-receiving plane side, and the catalyst layer 14 and the porous semiconductor layer 12 are alternately formed between third insulating layers 26c on the conductive layer 18 of the substrate 17 on a non-light receiving plane side. The porous semiconductor layer 12 and the catalyst layer 14 can be formed by the above-mentioned method.

Step (2): A laminated body obtained by forming the porous semiconductor layers 12 and the catalyst layer 14 on the substrates 10, 17 is immersed in a dye solution as described above to adsorb the dye on each porous semiconductor layer 12. Then, each laminated body is withdrawn from the dye solution and dried.

Step (3): An uncured resin material is applied onto a first insulating layer 26a of the substrate 10 or a third insulating layer 26c of the substrate 17. The uncured resin material of this case is a material for forming a second insulating layer 26b. In addition, the uncured resin material may be applied onto both first insulating layer 26a and third insulating layer 26c in about half the amount of resin material to be applied in applying to only one layer for each insulating layer.

Step (4): The respective substrates are overlaid on each other in such a way that the porous semiconductor layer 12 on the substrate 10 and the catalyst layer 14 on the substrate 17 are opposed to each other, and the uncured resin material is cured to form a second insulating layer 26b, and a pair of substrates 10, 17 are bonded to each other to be secured. In this time, when the uncured resin material is a photosensitive material, it is cured by irradiating light (for example, ultraviolet lay) from the side of a substrate having a light transmitting property, and when the uncured resin material is a thermosetting resin, it is cured by heating at a temperature at which a dye is not degraded.

Step (5): An electrolyte solution is filled into between a pair of substrates 10 and 17 to form an electrolyte layer 13 between the porous semiconductor layer 12 and the catalyst layer 14 of each photoelectric conversion device 1a, 1b. In this time, a gap part (not shown) is formed between substrates 10 and 17, and an electrolyte solution can be filled through this gap part by capillary action. Then, the gap part is sealed with a resin.

Embodiment 3

Figure 5:
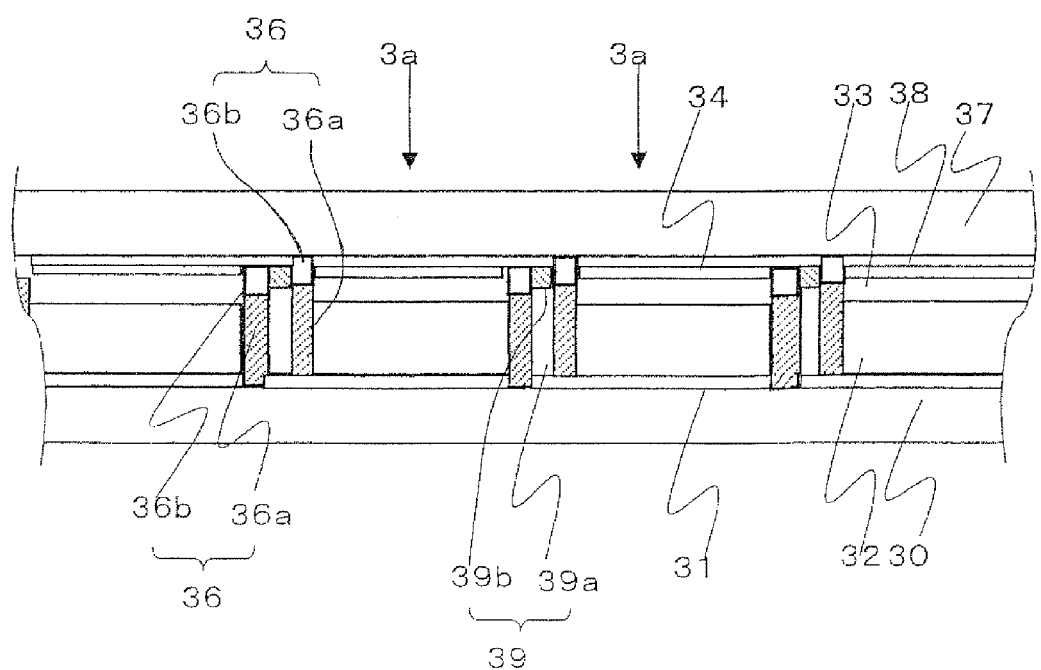
FIG. 5 is a schematic constituent sectional view showing a dye-sensitized solar cell module of Embodiment 3 of the present invention.
Figure 6A:
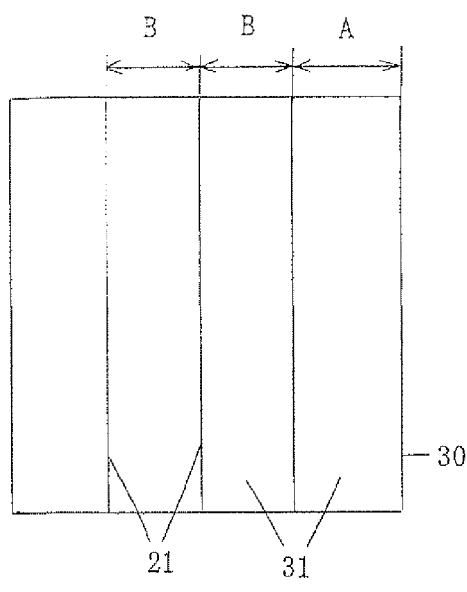
FIG. 6 is a first diagram illustrating a production process of the dye-sensitized solar cell module of Embodiment 3.
Figure 6B:
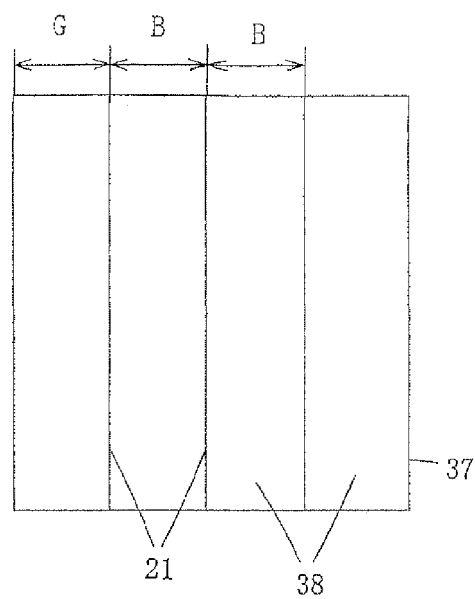

FIG. 5 is a sectional view showing a schematic constitution of a dye-sensitized solar cell module of Embodiment 3 of the present invention. In this solar cell module, a plurality of photoelectric conversion device 3a having the same constitutions are located in a state of being electrically connected in series between a pair of substrates 30, 37 having a plurality of conductive layers 31, 38 on the surface of the substrates. In this embodiment, a lower substrate in FIG. 5 is taken as a light-receiving plane side, and at least the lower substrate 30 and the conductive layer 31 have a light transmitting property. The photoelectric conversion device 3a is formed by laminating the porous semiconductor layer 32, the electrolyte layer 33, and the catalyst layer 34 in succession from the lower substrate 30, and the upper and lower conductive layers 31 and 38 are divided into two or more parts so as to be connected to only the porous semiconductor layer 32 and the catalyst layer 34, respectively, in the respective photoelectric conversion devices 3a. In addition, FIG. 6(a) shows a plurality of conductive layers 31 formed in parallel with one another on the surface of the substrate 30, and FIG. 6(b) shows a plurality of conductive layers 38 formed in parallel with one another on the surface of the substrate 37, and a reference numeral 21 represents a scribe line which divides the conductive layers 31, 38 into two or more parts.

In this solar cell module, between the adjacent photoelectric conversion devices 3a, a pair of insulating layers 36, 36 located along one photoelectric conversion devices 3a and located along the other photoelectric conversion devices 3a, and a connecting conductive layer 39 located between the pair of insulating layers 36, 36 are formed.

Each insulating layer 36 is composed of the first insulating layer 36a and the second insulating layer 36b as with Embodiment 1 and the connecting conductive layer 39 formed by laminating a first connecting conductive layer 39a and a second connecting conductive layer 39b.

In FIG. 5, in the insulating layer 36 on the right side of the connecting conductive layer 39, the first insulating layer 36a is formed on the lower conductive layer 31 in a state of contacting the porous semiconductor layer 32 and the second insulating layer 36b is formed between the upper adjacent conductive layer 38, 38 in a state of contacting the substrate 37. On the other hand, in the insulating layer 36 on the left side of the connecting conductive layer 39, the first insulating layer 36a is formed on the lower substrate 30 between the adjacent conductive layers 31 and 31 and the second insulating layer 36b is formed in a state of contacting the upper conductive layer 38.

Further, a first connecting conductive layer 39a is in contact with the lower conductive layer 31 and a second connecting conductive layer 39b is in contact with the upper conductive layer 38. In this case, constituent materials of the first connecting conductive layer 39a and the second connecting conductive layer 39b are preferably materials describe above.

By these insulating layers 36, photoelectric conversion devices are cut off from each other and this prevents an electrolyte in the electrolyte layer 33 of one photoelectric conversion device from penetrating into an adjacent another photoelectric conversion device. Further, a periphery of the solar cell module between a pair of the substrate 30, 37 is sealed with the insulating layer 36 and a resin sealing portion not shown and leakage of the electrolyte is prevented.

Further, a plurality of photoelectric conversion devices 3a each of which is formed by laminating the porous semiconductor layer 32, the electrolyte layer 33, and the catalyst layer 34 in this order from the light-receiving plane side can be electrically connected through the connecting conductive layer 39.

In this solar cell module, thicknesses of the conductive layers 31, 38 are 0.1 to 1 μm, respectively, a thickness of the porous semiconductor layer 32 is 1 to 50 μm, and a thickness of the catalyst layer 34 is 5 nm to 1 μm. Further, a thickness of the insulating layer 36 is 1 to 50 μm, and this thickness is equal to a distance between a lower or upper conductive layer and an upper or lower substrate, and a thickness of the first insulating layer 36a is 1 to 50 μm and a thickness of the second insulating layer 36b is less than 50 μm. Further, a thickness of the connecting conductive layer 39 is 1 to 50 μm, and this thickness is equal to a distance between a lower conductive layer and an upper conductive layer, and a thickness of the first connecting conductive layer 39a is 1 to 50 μm and a thickness of the second connecting conductive layer 39b is less than 50 μm.

The solar cell module shown in FIG. 5 can be produced according to the following procedure.

The step (A) further comprises a step of forming a strap-form connecting conductive layer (first connecting conductive layer 39a) on a conductive layer 31 of one substrate 30, and in the step (A), after the formation of the connecting conductive layer, insulating layers (first insulating layers 36a) adjacent to both sides of each connecting conductive layer are formed on the conductive layer 31 and on the substrate surface before or after performing the above-mentioned step (B), and the step (B) comprises the step (1) in which the porous semiconductor layer 32 and the catalyst layer 34 are formed on the respective conductive layers 31, 38 of the pair of the substrates 30, 37, the step (2) in which a dye is adsorbed on the porous semiconductor layer 32, the step (3) in which an uncured resin material is applied onto the insulating layer, the step (4) in which a pair of substrates 30 and 37 are overlaid on each other in such a way that the porous semiconductor layer 32 on one substrate and the catalyst layer 34 on the other substrate are opposed to each other, and the uncured resin material is cured to form a second insulating layer 36b, and the step (5) in which an electrolyte solution is filled into between a pair of substrates 30 and 37 to form an electrolyte layer 33 between the porous semiconductor layer 32 and the catalyst layer 34, and further comprises the step of applying an uncured conductive material onto the connecting conductive layer immediately before or after the step (3) and the step of curing the uncured conductive material concurrently with or immediately after the step (4).

Figure 7:
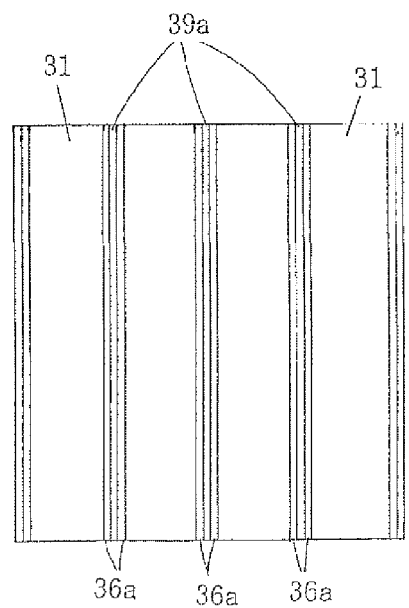
FIG. 7 is a second diagram illustrating the production process of the dye-sensitized solar cell module of Embodiment 3.

Specifically, in the above-mentioned step (A), as shown in FIG. 7, first, a plurality of strap-form connecting conductive layer are formed on the respective conductive layers 31 on the surface of one substrate 30 (refer to FIG. 6(a)). This connecting conductive layer is a first connecting conductive layer 39a. The first connecting conductive layer 39a can be formed by the above-mentioned method. Then, insulating layers adjacent to both sides of each first connecting conductive layer 39a are formed. These insulating layers are a first insulating layer 36a. In this time, one of a pair of first insulating layers 36a adjacent to one first connecting conductive layer 39a is formed on the conductive layer 31 and the other is formed on the substrate 30 (refer to FIG. 5).

Next, in Embodiment 3, in the above-mentioned step (B), the step of applying an uncured conductive material onto the connecting conductive layer immediately before or after the above-mentioned step (3) of applying an uncured resin material onto the first insulating layer 36a, and the step of curing the uncured conductive material concurrently with or immediately after the above-mentioned step (4) of curing the uncured resin material are carried out. In addition, a drying step may be added after the uncured conductive material is applied.

The step (B) will be specifically described. In the step (B), the following steps (1) to (5) are performed.

Figure 8A:
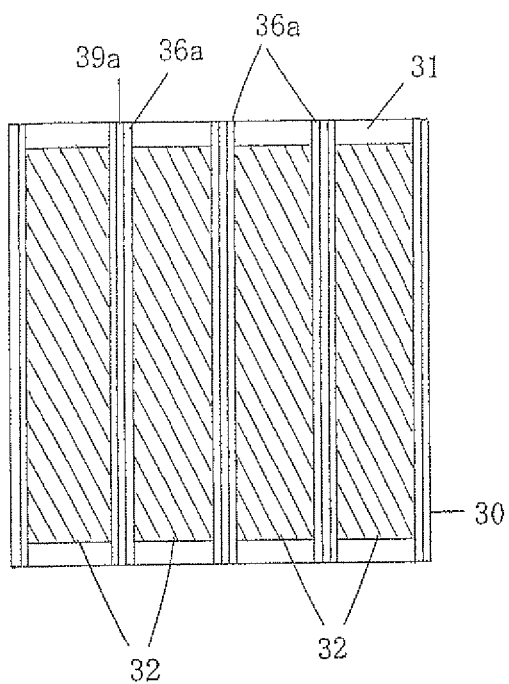
FIG. 8 is a third diagram illustrating the production process of the dye-sensitized solar cell module of Embodiment 3.
Figure 8B:
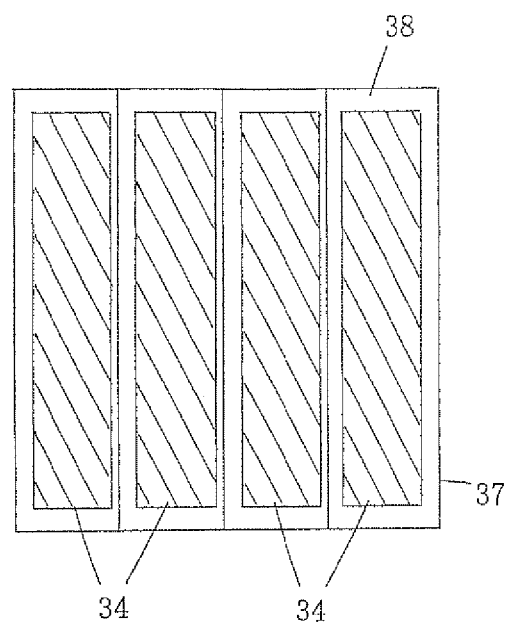

Step (1): As shown in FIG. 8(a), the porous semiconductor layer 32 is formed between first insulating layers 36a on the conductive layer 31 of the substrate 30 on a light-receiving plane side, and as shown in FIG. 8(b), the catalyst layer 34 is formed on the conductive layer 38 of the substrate 37 on a non-light receiving plane side. The porous semiconductor layer 32 and the catalyst layer 34 can be formed by the above-mentioned method.

Step (2): A laminated body obtained by forming the porous semiconductor layers 32 on the substrate 30 is immersed in a dye solution as described above to adsorb the dye on each porous semiconductor layer 32. Then, each laminated body is withdrawn from the dye solution and dried.

Step (3): An uncured conductive material is applied onto a first connecting conductive layer 39a of the substrate 30, and an uncured resin material is applied onto a first insulating layer 36a of the substrate 30. The uncured conductive material is a material for forming a second connecting conductive layer and the uncured resin material is a material for forming a second insulating layer 36b. The uncured conductive material is preferably a material having a curing temperature of 200° C. or less, furthermore 150° C. or less to decrease damage to a dye adsorbed on the porous semiconductor layer.

Step (4): The respective substrates are overlaid on each other in such a way that the porous semiconductor layer 32 on the substrate 30 and the catalyst layer 34 on the substrate 37 are opposed to each other, and the uncured conductive material and the uncured resin material are cured to form a second connecting conductive layer 39b and a second insulating layer 36b, and a pair of substrates 30, 37 are bonded to each other to be secured. In this time, when the uncured resin material is a photosensitive material, it is cured by irradiating light (for example, ultraviolet lay) from the side of a substrate having a light transmitting property before curing the uncured conductive material. Further, when the uncured resin material is a thermosetting resin, it is cured by heating it together with the uncured conductive material at a temperature at which a dye is not degraded.

Step (5): An electrolyte solution is filled into between a pair of substrates 30 and 37 to form an electrolyte layer 33 between the porous semiconductor layer 32 and the catalyst layer 34 of each photoelectric conversion device 3a. In this time, a gap part (not shown) is formed between substrates 30 and 37, and an electrolyte solution can be filled through this gap part by capillary action. Then, the gap part is sealed with a resin.

EXAMPLES

Example 1

A dye-sensitized solar cell module shown in FIG. 4 was prepared according to the following procedure.

Figure 2B:
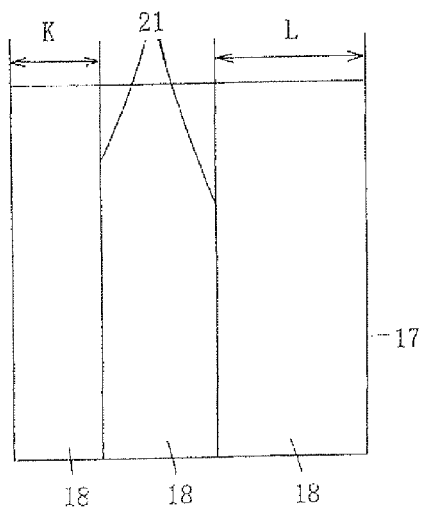

First, two glass substrates with $SnO_2$ coating produced by Nippon Sheet Glass Co., Ltd having a size of 43 mm×65 mm was provided as substrates 10, 17 on which a conductive layer made of a $SnO_2$ is respectively formed as shown in FIGS. 2(a) and 2(b).

Next, scribing was performed by irradiating laser light (YAG laser, basic wavelength 1.06 μm, manufactured by SEISHIN TRADING Co., Ltd.) to a $SnO_2$ of a conductive layer in such a way that in FIG. 2, a dimension I is 15.5 mm, a dimension J is 15.5 mm, a dimension K is 15.5 mm, and a dimension L is 15.5 mm to evaporate the $SnO_2$. In addition, the dimensions I to L are the same, but these dimensions are not drawn to scale for convenience in FIG. 2.

Subsequently, as shown in FIG. 2 and FIG. 3, in a pair of substrates 10, 17, a width of a region A is taken as 16 mm, a width of a region B is taken as 10 mm, a width of a region C is taken as 5 mm, a width of a region D is taken as 7 mm, a width of a region E is taken as 4 mm, a width of a region F is taken as 10 mm and a width of a region H is taken as 5 mm, and glass frits (produced by Noritake Co., Ltd.), which are a material of a first insulating layer, were applied to the vicinities of boundaries between the regions A and C, the regions C and D (D and C), the regions B and C, the regions E and C and the regions C and F with a screen-printing machine (LS-150 manufactured by NEWLONG SEIMITSU KOGYO Co., Ltd.), and the applied glass frits were pre-dried at 100° C. for 10 minutes and then fired at 450° C. for 1 hour. Thereby, a first insulating layer 26a was formed on the substrate 10 and a third insulating layer 26c was formed on the substrate 17. The first insulating layer 26a and the third insulating layer 26b respectively have a film thickness of about 25 μm and a width of about 500 μm. Measurement of the film thickness was performed with SURFCOM 1400A (manufactured by TOKYO SEIMITSU Co., Ltd.).

Subsequently, a platinum film was formed in a film thickness of about 5 nm at a deposition rate of 0.1 Å/sec as a catalyst layer 14 in the respective regions C of the substrates 10 and 17 using an electron beam vapor deposition machine EVD-500A (manufactured by ANELVA Corp.).

Next, a commercially available titanium oxide paste (produced by Solaronix S.A., trade name: Ti-Nanoxide D/SP, average particle diameter: 13 nm) was applied to the regions A, D and B of the substrate 10 and the regions D and D of the substrate 17 using a screen plate with an opening of 5.25 mm×50 mm and a screen-printing machine (LS-150 manufactured by NEWLONG SEIMITSU KOGYO Co., Ltd.), and the applied titanium oxide paste was leveled at room temperature for 1 hour, and the resulting coat was pre-dried at 80° C. for 20 minutes and fired at 450° C. for 1 hour. This process step was repeated five times and thereby a titanium oxide film having a film thickness of 30 μm was obtained as a porous semiconductor layer 12. Measurement of the film thickness was performed with SURFCOM 1400A (manufactured by TOKYO SEIMITSU Co., Ltd.).

Next, a dye was adsorbed on each porous semiconductor layer 12 according to the following procedure.

First, as a sensitizing dye, Ruthenium620-1H3TBA dye (produced by Solaronix S.A.) was used, and a mixed solution (concentration of the sensitizing dye; $4 \times 10^{-4}$ mol/liter) of this dye in a mixed solvent of acetonitrile (produced by Aldrich Chemical Company) and t-butyl alcohol (produced by Aldrich Chemical Company) in proportions by volume of 1:1 was prepared. Next, a laminated body having the porous semiconductor layers 12 on the substrates 10, 17 was immersed in this mixed solution and left standing at a temperature of 40° C. for 20 hours. Then, the laminated body was cleaned with ethanol (produced by Aldrich Chemical Company) and dried.

Next, as an oxidation-reduction electrolyte solution, a solution, which was prepared by dissolving DMPII (produced by SHIKOKU CHEMICALS Corp.) with a concentration of 0.6 mol/l, LiI (produced by Aldrich Chemical Company) with a concentration of 0.1 mol/l, TBP (produced by Aldrich Chemical Company) with a concentration of 0.5 mol/l, and $I_2$ (produced by TOKYO CHEMICAL INDUSTRY Co., Ltd.) with a concentration of 0.01 mol/l in acetonitrile as an solvent, was provided.

Subsequently, an uncured UV-curable resin 31X-101 (produced by Three Bond Co., Ltd.) was applied onto the respective first insulating layer 26a of the substrate 10 using a dispenser (manufactured by EFD Corporation). In this time, an application speed and a discharge pressure were adjusted in such a way that a film thickness of an applied film is about 45 μm.

Next, after two substrates were bonded to each other in such a way that the porous semiconductor layer 12 of one substrate 10 or 17 and the catalyst layer 14 of the other substrate 17 or 10 were opposed to each other, two substrates 10, 17 were joined by the second insulating layer 26b through the first insulating layer 26a and the third insulating layer 26c and the respective substrates by irradiating ultraviolet lay to the uncured resin using an ultraviolet lamp NOVACURE (manufactured by EFD Corp.) to cure the resin.

Then, a solar cell module corresponding to FIG. 4 was prepared by filling an oxidation-reduction electrolyte solution through a gap between the above two substrates by capillary action, and the filling portion was sealed with a photosensitive resin or a thermosetting resin.

Further, light with an intensity of 1 kW/m² (an AM 1.5 Solar Simulator) was irradiated to the resulting solar cell module to measure photoelectric conversion efficiency. The result of measurement is shown in Table 1. In addition, photoelectric conversion efficiency was taken as a value determined by multiplying $V_{OC}$ and FF by a value obtained by dividing $I_{SC}$ by an area of an aperture area (area surrounding several exterior frames of a photoelectric conversion device in a module).

Further, after a measurement, the solar cell module was decomposed, and the first, the second and the third insulating layers 26a, 26b and 26c were observed with an optical microscope SZX-12 (manufactured by Olympus Corp.), and consequently it was found that the second insulating layer 26b was crushed as shown in FIG. 10 and a film thickness of the second insulating layer 26b was 2 μm (at crushed portion).

Example 2

A solar cell module corresponding to FIG. 1 was prepared in the same manner as in Example 1 except that the first insulating layer 16a was formed on only the substrate 10 and a film thickness of the porous semiconductor layer 12 was 15 μm and a film thickness of the first insulating layer 16a was about 30 μm in Example 1.

Photoelectric conversion efficiency was measured by irradiating light with an intensity of 1 kW/m² (an AM 1.5 Solar Simulator) to the resulting solar cell module, and the result of measurement is shown in Table 1.

Further, after a measurement, the solar cell module was decomposed, and the first insulating layer 16a and the second insulating layer 16b were observed with an optical microscope SZX-12 (manufactured by Olympus Corp.), and consequently it was found that the second insulating layer 16b was crushed as shown in FIG. 9 and a film thickness of the second insulating layer 26b was 1 μm (at crushed portion).

Example 3

In Example 3, a solar cell module was prepared in the same manner as in Example 1 except for applying a catalyst paste (trade name: Pt-Catalyst T/SP, produced by Solaronix S.A.), which is a material of a catalyst layer, using a screen-printing machine (LS-150, manufactured by NEWLONG SEIMITSU KOGYO Co., Ltd.), and firing the applied catalyst paste at 450° C. for 1 hour to form a catalyst layer.

A photoelectric conversion efficiency was measured by irradiating light with an intensity of 1 kW/m² (an AM 1.5 Solar Simulator) to the resulting solar cell module, and the result of measurement is shown in Table 1.

Example 4

In Example 4, a solar cell module was prepared in the same manner as in Example 1 except for adjusting a pressure of a screen-printing machine in such a way that film thicknesses of a first and a third insulating layers 26a and 26c were about 12 μm.

A photoelectric conversion efficiency was measured by irradiating light with an intensity of 1 kW/m² (an AM 1.5 Solar Simulator) to the resulting solar cell module, and the result of measurement is shown in Table 1.

Further, after a measurement, the solar cell module was decomposed and film thicknesses of the first, the second and the third insulating layers were observed with an optical microscope SZX-12 (manufactured by Olympus Corp.), and consequently it was found that the film thicknesses were 11 μm, 6 μm and 12 μm, respectively.

Example 5

In Example 5, a solar cell module was prepared in the same manner as in Example 1 except for adjusting a mesh count of a screen plate in such a way that film thicknesses of a first and a third insulating layers 26a and 26c were about 8 μm.

A photoelectric conversion efficiency was measured by irradiating light with an intensity of 1 kW/m$^2$ (an AM 1.5 Solar Simulator) to the resulting solar cell module, and the result of measurement is shown in Table 1.

Further, after a measurement, the solar cell module was decomposed and film thicknesses of the first, the second and the third insulating layers were observed with an optical microscope SZX-12 (manufactured by Olympus Corp.), and consequently it was found that the film thicknesses were 8 μm, 14 μm and 9 μm, respectively.

Example 6

In Example 6, a solar cell module was prepared in the same manner as in Example 1 except for adjusting a mesh count of a screen plate in such a way that film thicknesses of a first and a third insulating layers 26a and 26c were about 30 μm.

A photoelectric conversion efficiency was measured by irradiating light with an intensity of 1 kW/m$^2$ (an AM 1.5 Solar Simulator) to the resulting solar cell module, and the result of measurement is shown in Table 1.

Further, after a measurement, the solar cell module was decomposed and film thicknesses of the first, the second and the third insulating layers were observed with an optical microscope SZX-12 (manufactured by Olympus Corp.), and consequently it was found that the film thicknesses were 28 μm, 1 μm and 27 μm, respectively.

Comparative Example 1

A solar cell module of Comparative Example 1 was prepared in the same manner as in Example 1 except that after the catalyst layer 14 and the porous semiconductor layer 12 were formed, the first and the third insulating layers were formed and a film thickness of the porous semiconductor layer 12 was 15 μm in Example 1.

A photoelectric conversion efficiency was measured by irradiating light with an intensity of 1 kW/m$^2$ (an AM 1.5 Solar Simulator) to the resulting solar cell module, and the result of measurement is shown in Table 1.

Comparative Example 2

A solar cell module of Comparative Example 2 was prepared in the same manner as in Example 1 except that in Example 1, the first insulating layer 26a and the third insulating layer 26c were formed, but in Comparative Example 2, an uncured resin was applied in an applied film thickness of 40 μm on the substrate without forming the first insulating layer and the third insulating layer and then the applied uncured resin was cured to form the second insulating layer.

In this case, there is a part of the porous semiconductor layer (titanium oxide film) which contacts the substrate before the uncured resin contacts the substrate when two substrates were bonded to each other, and the uncured resin applied onto one substrate did not adhere to the other substrate. Accordingly, a solar cell module could not be prepared.

Comparative Example 3

In Comparative Example 3, a solar cell module of Comparative Example 3 was prepared in the same manner as in Comparative Example 2 except for adjusting an application speed and a discharge pressure in such a way that an applied film thickness is 140 μm using a dispenser (manufactured by EFD Corp.). In this case, an uncured resin at and about a substrate center was penetrated into between the porous semiconductor layer and the catalyst layer when two substrates were bonded to each other.

A photoelectric conversion efficiency was measured by irradiating light with an intensity of 1 kW/m$^2$ (an AM 1.5 Solar Simulator) to the resulting solar cell module, and the result of measurement is shown in Table 1.

Comparative Example 4

In Comparative Example 4, a solar cell module was prepared in the same manner as in Comparative Example 1 except for forming a catalyst paste (trade name. Pt-Catalyst T/SP, produced by Solaronix S.A.), which is a material of a catalyst layer, using a screen-printing machine (LS-150 manufactured by NEWLONG SEIMITSU KOGYO Co., Ltd.), and firing the applied catalyst paste at 450° C. for 1 hour to form a catalyst layer.

A photoelectric conversion efficiency was measured by irradiating light with an intensity of 1 kW/m$^2$ (an AM 1.5 Solar Simulator) to the resulting solar cell module, and the result of measurement is shown in Table 1.

Comparative Example 5

In Comparative Example 5, a solar cell module was prepared in the same manner as in Comparative Example 2 except for forming a catalyst paste (trade name: Pt-Catalyst T/SP, produced by Solaronix S.A.), which is a material of a catalyst layer, using a screen-printing machine (LS-150 manufactured by NEWLONG SEIMITSU KOGYO Co., Ltd.), and firing the applied catalyst paste at 450° C. for 1 hour to form a catalyst layer.

A photoelectric conversion efficiency was measured by irradiating light with an intensity of 1 kW/m$^2$ (an AM 1.5 Solar Simulator) to the resulting solar cell module, and the result of measurement is shown in Table 1.

Example 7

A solar cell module shown in FIG. 5 was formed according to the following procedure.

As a pair of conductive substrates 10, 17, two glass substrates with SnO$_2$ coating produced by Nippon Sheet Glass Co., Ltd having a size of 44 mm×70 mm were provided. In addition, as conductive layers 11, 17, fluorine-doped tin oxide was employed.

In the substrates 30, 37 shown in FIGS. 6(a) and 6(b), a SnO$_2$ layer was formed in a comb-like shape by patterning setting a pitch (a width of the region B), at which a unit photoelectric conversion device is formed, at 8 mm by irradiating laser light (YAG laser) to the SnO$_2$ layer in such a way that a width of the region A is 18 mm, a width of the region B is 8 mm and a width of the region G is 10 mm to evaporate the SnO$_2$.

Next, a silver paste (produced by Noritake Co., Ltd.), which is a material for forming a first connecting conductive layer 39a, was applied along a scribe line 21 on right three conductive layers 31 on the substrate 30 shown in FIG. 6(a), and the applied paste was pre-dried at 80° C. for 20 minutes and then fired at 450° C. for 1 hour to form a first connecting conductive layer 39a having a film thickness of 22 μm and a width of 300 μm (refer to FIG. 5 and FIG. 7).

Next, glass frits (produced by Noritake Co., Ltd.) were applied to both sides of each first connecting conductive layer 39a using a screen-printing machine (LS-150 manufactured by NEWLONG SEIMITSU KOGYO Co., Ltd.), and the applied glass frits were pre-dried at 100° C. for 10 minutes and then fired at 450° C. for 1 hour to form a first insulating layer 36a, 36a having a film thickness of 21 μm and a width of 500 μm (refer to FIG. 5 and FIG. 7).

Subsequently, a porous semiconductor layer 32 was formed by the same method as in Example 1, as shown in FIG. 8(a), on a conductive layer 31 of the substrate 30 between the first connecting conductive layers 39a.

Next, a dye was adsorbed on each semiconductor layer 32 according to the following procedure. First, as a sensitizing dye, Ruthenium620-1H3TBA dye (produced by Solaronix S.A.) was used, and a mixed solution (concentration of the sensitizing dye; $4 \times 10^{-4}$ mol/liter) of this dye in a mixed solvent of acetonitrile and t-butyl alcohol in proportions by volume of 1:1 was prepared. Next, a laminated body having the porous semiconductor layers 32 formed on the substrate 30 was immersed in this mixed solution and left standing at a temperature of 40° C. for 20 hours. Thereby, the sensitizing dye was adsorbed on the inside of the porous semiconductor layers 32 in an amount about $7 \times 10^{-8}$ mol/cm². Then, the laminated body was cleaned with ethanol (produced by Aldrich Chemical Company) and dried.

Next, a platinum film was formed in a film thickness of about 5 nm on the conductive layer 38 of the substrate 37 shown in FIG. 8(b) at a deposition rate of 0.1 Å/sec as a catalyst layer using an electron beam vapor deposition machine EVD-500A (manufactured by ANELVA Corp.).

Then, as an oxidation-reduction electrolyte solution, a solution, which was prepared by dissolving DMPII with a concentration of 0.6 mol/l, LiI with a concentration of 0.1 mol/l, TBP with a concentration of 0.5 mol/l, and $I_2$ with a concentration of 0.01 mol/l in acetonitrile as a solvent, was provided.

Next, an uncured UV-curable resin 31X-101 (produced by Three Bond Co., Ltd.) was applied onto the first insulating layer 36a, and furthermore, a conductive silver paste (produced by Fujikura Kasei Co., Ltd., trade name: "DOTITE") was applied onto the first connecting conductive layers 39a, and two substrates 30, 37 were bonded to each other with the porous semiconductor layer 32 of one substrate and the catalyst layer 34 of the other substrate opposed to each other. Then, by irradiating ultraviolet lay to the applied resin portion using an ultraviolet lamp and drying the applied resin portion at 120° C. for 10 minutes, a cured second insulating layer 36b and a cured second connecting conductive layer 39b were formed, and thereby the two substrates 30, 37 were secured by the insulating layer 36 and the connecting conductive layer 39.

Then, a solar cell module corresponding to FIG. 5 was prepared by filling the electrolyte solution through a gap between two substrates 30 and 37 by capillary action, and applying an UV-curable material 31X-101 (produced by ThreeBond Co., Ltd.) to the periphery of the gap, and irradiating ultraviolet lay to the applied ultraviolet curable material.

A photoelectric conversion efficiency was measured by irradiating light with an intensity of 1 kW/m² (an AM 1.5 Solar Simulator) to the resulting solar cell module, and the result of measurement is shown in Table 1.

Comparative Example 6

A solar cell module of Comparative Example 6 was prepared in the same manner as in Example 7 except that the first insulating layer 36a in Example 7 was formed after the porous semiconductor layer 32 was formed, and the second insulating layer and the second connecting conductive layer in Example 7 were omitted.

A photoelectric conversion efficiency was measured by irradiating light with an intensity of 1 kW/m² (an AM 1.5 Solar Simulator) to the resulting solar cell module, and the result of measurement is shown in Table 1.

TABLE 1

|  | short circuit current Isc (mA) | open circuit voltage Voc (V) | fill factor FF | conversion efficiency (%) |
| --- | --- | --- | --- | --- |
| Example 1 | 39.8 | 3.51 | 0.59 | 5.68 |
| Example 2 | 39.4 | 3.52 | 0.61 | 5.83 |
| Example 3 | 40.8 | 3.51 | 0.62 | 6.12 |
| Example 4 | 38.9 | 3.55 | 0.63 | 6.00 |
| Example 5 | 38.2 | 3.41 | 0.64 | 5.75 |
| Example 6 | 39.1 | 3.54 | 0.59 | 5.63 |
| Comparative Example 1 | 38.7 | 3.51 | 0.55 | 5.15 |
| Comparative Example 2 | — | — | — | — |
| Comparative Example 3 | 30.5 | 2.75 | 0.45 | 2.60 |
| Comparative Example 4 | 36.5 | 2.75 | 0.49 | 3.39 |
| Comparative Example 5 | 30.4 | 2.70 | 0.45 | 2.55 |
| Example 7 | 38.8 | 2.79 | 0.64 | 4.78 |
| Comparative Example 6 | 36.5 | 2.75 | 0.49 | 3.39 |

※APERTURE AREA: 14.5 cm²

The invention claimed is:

1. A dye-sensitized solar cell module which is characterized by providing a pair of opposed conductive substrates in which at least one of the substrates is transparent and a plurality of conductive layers are formed in parallel with one another on the each opposed surface of the substrates, a plurality of adjacent photoelectric conversion devices electrically connected in series between the pair of conductive substrates, and an insulating layer formed between the adjacent photoelectric conversion devices,
    wherein the photoelectric conversion devices have a porous semiconductor layer adsorbing a dye, an electrolyte layer and a catalyst layer, and
    the insulating layer has a two-layer structure consisting of a first insulating layer and a second insulating layer, a thickness of the first insulating layer is a thickness of the second insulating layer or more, and
    wherein the first insulating layer is made of an inorganic material and the second insulating layer is made of a material containing an organic polymer compound, and wherein the first insulating layer and the second insulating layer are made of different materials.

2. A dye-sensitized solar cell module of claim 1, wherein the insulating layer further comprises a third insulating layer, the second insulating layer is located between the third insulating layer and the first insulating layer, and the total thickness of a thickness of the first insulating layer and a thickness of the third insulating layer is a thickness of the second insulating layer or more.

3. A dye-sensitized solar cell module of claim 2, wherein the third insulating layer is made of an inorganic material.

4. A dye-sensitized solar cell module of claim 1, wherein the inorganic material containing silicon oxide, the organic polymer compound containing a photosensitive resin or a thermosetting resin having a curing temperature of 200° C. or less.

5. A dye-sensitized solar cell module of claim 1, further comprising an additional insulating layer thereby forming a pair of the insulating layers which are located along one photoelectric conversion device and adjacent another photoelectric conversion device, respectively, and a connecting conductive layer electrically connected to the pair of the above-mentioned conductive layers is formed between the pair of the above-mentioned insulating layers.

6. A dye-sensitized solar cell module of claim 5, wherein the connecting conductive layer has a two-layer structure consisting of a first connecting conductive layer and a second connecting conductive layer, and a thickness of the first connecting conductive layer is a thickness of the second connecting conductive layer or more.

7. A dye-sensitized solar cell module of claim 6, wherein the second connecting conductive layer is made of a conductive material having a curing temperature of 200° C. or less.

* * * * *